United States Patent
Fenocchi et al.

(10) Patent No.: US 12,366,276 B1
(45) Date of Patent: Jul. 22, 2025

(54) MAGNETIC TORSIONAL SPRING WITH LINEAR TORQUE

(71) Applicant: MS Directional, LLC, Conroe, TX (US)

(72) Inventors: Arnold Fenocchi, London (GB); Peter Nicholas Wells, Houston, TX (US)

(73) Assignee: MS DIRECTIONAL, LLC, Conroe, TX (US)

( * ) Notice: Subject to any disclaimer, the term of this patent is extended or adjusted under 35 U.S.C. 154(b) by 285 days.

(21) Appl. No.: 18/151,154

(22) Filed: Jan. 6, 2023

Related U.S. Application Data

(60) Provisional application No. 63/297,377, filed on Jan. 7, 2022.

(51) Int. Cl.
*F16F 6/00* (2006.01)

(52) U.S. Cl.
CPC .......... *F16F 6/005* (2013.01); *F16F 2222/06* (2013.01)

(58) Field of Classification Search
CPC ................................. F16F 6/005; F16F 15/18
See application file for complete search history.

(56) References Cited

U.S. PATENT DOCUMENTS

2014/0060980 A1* 3/2014 Piech ...................... H02K 7/106
188/267

FOREIGN PATENT DOCUMENTS

JP 2000292298 A * 10/2000

OTHER PUBLICATIONS

JP-2000292298-A—English Machine Translation (Year: 2000).*

* cited by examiner

*Primary Examiner* — Melanie Torres Williams
(74) *Attorney, Agent, or Firm* — Jackson Walker LLP

(57) ABSTRACT

A system and method with a torque response linearly proportional to angular displacement between inner and outer rotors having magnets, forming magnetic poles, to provide a linear magnetic torsional spring with a wide operating region. Multiple rotor sections of magnetic poles in at least one of the inner and outer rotors are provided wherein at least one rotor section of magnets is circumferentially offset by an offset angle from at least one other rotor section of magnets. The magnetic torsional spring can produce linear torque T, where $T=+/-k\theta$, k is the angular spring constant, and $\theta$ is the angular displacement. The torque responses from each rotor section can cause a combined torque response to function as the linear magnetic torsional spring. The extended linear portion can provide a useful radial angle of rotation for a linear torque to counteract a spring force applied to the rotor.

20 Claims, 22 Drawing Sheets

MAGNETIC TORSIONAL SPRING WITH LINEAR TORQUE

CROSS REFERENCE TO RELATED APPLICATIONS

This application claims the benefit of U.S. Provisional Application Ser. No. 63/297,377, entitled "Magnetic Torsional Spring with Linear Torque", filed Jan. 7, 2021, which is incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to rotary magnetic assemblies. More specifically, the disclosure relates modified rotary magnetic assemblies that can function as a magnetic torsional is spring with a relatively large developed linear torque response compared to angular displacement during a portion of its angular displacement, where angular displacement can be converted to a directly proportional response in torque or linear displacement.

Description of the Related Art

FIG. 1A is a schematic perspective view of a known rotary magnetic coupling with one section. FIG. 1B is a schematic perspective view of internal components of the rotary magnetic coupling of FIG. 1A. Rotary magnetic couplings 2 generally are made of an inner rotor 4 with back-iron material 5 and magnets 6 and an outer rotor 8 with back-iron material 9 and magnets 10 disposed radially around the inner rotor. The magnets form North and South magnetic poles that interact with each other to attract or repel depending on the relative polarity. The magnets on the inner rotor 4 and outer rotor 8 are shown separated by a circumferential gap 14, which can vary in size, but can be zero, that is, no gap of separation. The magnets are generally permanent magnets as may be used to transfer rotary motion through magnetically generated torque across a radial gap 12 (including an intervening nonconductive layer) without contact. The magnetic circuit is completed by the back-iron of each rotor, which is typically a soft magnetic conductive material. The inner or outer rotor can serve as a drive rotor and the other can serve as the driven rotor to which the torque is transferred. The coupling generally can have any even matching numbers of magnets and their respective poles on each rotor. The number of poles determine the pole pitch angle φ. This schematic example of a rotary magnetic coupling has six magnets around the rotors and therefore is a 6-pole coupling with magnets generally spaced evenly around the rotors at 60° (360° divided by 6). The magnets may be magnetized in the radial direction or quasi-radial direction, in the case of being manufactured from parallel magnetized blocks. Adjacent magnets are generally placed with alternating opposite magnetized directions. For example, where a first magnet's North Pole is facing a center of a rotor, an adjacent magnet's South Pole will be facing the center of the rotor.

Magnets on the drive rotor interact in a noncontact manner with magnets on a driven rotor as the drive rotor is rotated. The magnetic interaction causes the driven rotor to rotate, generating rotary torque resulting in the driven rotor being able to power devices or systems attached to the driven rotor. Rotary magnetic couplings 2 are frequently used to transfer torque without contact between the rotors across a barrier between the rotors, such as a sealed barrier in an explosive environment. In such applications, the drive rotor can be rotated by an electric motor in a nonhazardous environment to safely transfer the torque to the driven rotor in a hazardous environment. Similarly, rotary magnetic couplings can be used to transfer torque safely from drive rotor in a dry environment to the driven rotor in an aqueous environment.

FIG. 2 is a schematic cross sectional diagram illustrating definitions of terms used herein and showing a general stable alignment of inner and outer rotors and illustrative magnet field paths. The magnets are separated by the circumferential gaps where the total dimension of a circumference of a magnet width 16 (magnet span) plus a gap width 17 will equal one pole pitch 18. The pole pitch can be expressed in an angle φ in degrees. In the example of FIG. 2, the pole pitch would be 60° based on 360° divided by the number of poles of 6. In at least some respects, the magnetic pole width to pole pitch (magnetic pole width divided by pole pitch, herein "magnetic arc ratio" or "MAR") provides an useful characterization, where for example, a magnetic arc ratio of 1.0 represents no gap and 0.50 represents an equal magnetic pole width and circumferential gap width. If the angle of the magnet arc was 40°, then the magnetic arc ratio would be 40 divided by 60 equals 0.67. The circumferential gaps between the magnets in magnetic couplings with a single rotor set may typically create a small region of no particular practical use where the torque is linear with rotational displacement. A design with no circumferential spacing between the magnets will typically not have a linear region from the interaction of the inner and outer rotors during rotation. Generally, the greater the number of magnetic poles, the greater the torque capacity of the arrangement. It is understood that the method of torque generation is partly dependent on a change of reluctance of the magnetic circuit, hence the greater the number of poles, the greater the number of N-S interfaces and therefore the greater the change in reluctance as the inner and outer rotors have rotational motion relative to the other. However, a wide circumferential gap between the poles reduces the amount of permanent magnetic material and reduces the maximum torque achievable. Such a result is counter to the purpose of the magnetic coupling to efficiently transfer torque between the rotors.

Separate from the operation of a rotary magnetic coupling, rotary torque can be generated by a mechanical spring having a force F depending on its movement from a normal state, where F=+/−k x, k is the spring constant, and x is the extension (or compression) generally in a linear or circumferential direction. For example, a spring can be attached to a structure. An outside force can cause the structure to at least partially rotate that changes a length of the spring, thereby increasingly biasing the structure as the force continues to rotate the structure. When the force stops, the biasing spring can cause the structure to return to a normal position. As another example, a structure with suitable material can be forced to twist below a yield stress of the material to act as a torsional spring. When the force stops and the structure is released, the structure can spring back into its normal state.

There are times in which a desirable result is to at least partially counterbalance a spring force without necessarily changing the spring due to other constraints. Because generally springs are linear in their performance response, then the counterbalancing force would also be desirably linear to counterbalance different valves of the spring force.

BRIEF SUMMARY OF THE INVENTION

The present invention is concerned with linearity of a produced torque response relative to angular displacement between inner and outer rotors having magnets, forming magnetic poles, and discloses a system and a method to reliably provide that the assembly functions as a linear magnetic torsional spring with a substantially wide operating region. The disclosure provides for multiple rotor sections of magnets in at least one of the inner and outer rotors wherein at least one rotor section of magnets forming magnetic poles is circumferentially offset by an offset angle from at least one other rotor section of magnets forming magnetic poles. In at least one embodiment, the magnetic torsional spring produces linear torque T, where T=+/−k θ, k is the angular spring constant, and θ is the angular displacement. The torque responses from each rotor section when properly designed can cause a combined torque response with an extended linear portion to function as the linear magnetic torsional spring. The extended linear portion of the magnetic torsional spring can provide a useful radial angle of rotation for a linear torque to counteract a spring force applied to the rotor. The invention can be used in various applications where rotary equivalent responses of a linear spring are beneficial, such as controlling movement of a structure with a linear response.

The disclosure provides a magnetic torsional spring, comprising at least two rotor sections, each rotor section comprising: an outer rotor with an inner peripheral cylindrical surface, the outer rotor comprising a plurality of magnets having an inner magnetic surface and being disposed circumferentially around the inner peripheral cylindrical surface; an inner rotor with an outer peripheral cylindrical surface, the inner rotor comprising a plurality of magnets having an outer magnetic surface and being disposed circumferentially around the outer peripheral cylindrical surface; and the inner rotor sized to fit inside an inside diameter of the outer rotor with a radial gap between the outer magnetic surface and the inner magnetic surface; wherein one of the rotors is configured to be rotated relative to the other rotor, and further wherein at least one of the magnets of a rotor of one rotor section is angularly offset from at least one of the magnets of a corresponding rotor of another rotor section. The disclosure also provides a method of controlling movement of a structure, comprising: rotating at least one rotor of the at least two rotor sections; and controlling movement of the structure within a linear portion of a torque response developed from the rotating.

The disclosure provides a magnetic torsional spring, comprising at least one rotor section comprising: an outer rotor with an inner peripheral cylindrical surface, the outer rotor comprising a plurality of magnets having an inner magnetic surface and being disposed circumferentially around the inner peripheral cylindrical surface; an inner rotor with an outer peripheral cylindrical surface, the inner rotor comprising a plurality of magnets having an outer magnetic surface and being disposed circumferentially around the outer peripheral cylindrical surface; and the inner rotor sized to fit inside an inside diameter of the outer rotor with a radial gap between the outer magnetic surface and the inner magnetic surface; wherein at least one of the magnets of at least one rotor has a longitudinal axis with an axial length and wherein the axial length of the at least one of the magnets decreases at an increasing distance from the longitudinal axis. The disclosure also provides a method of controlling movement of a structure, comprising: rotating the at least one rotor section; and controlling movement of the structure within a linear portion of a torque response developed from the rotating.

DETAILED DESCRIPTION

Figure 1A:
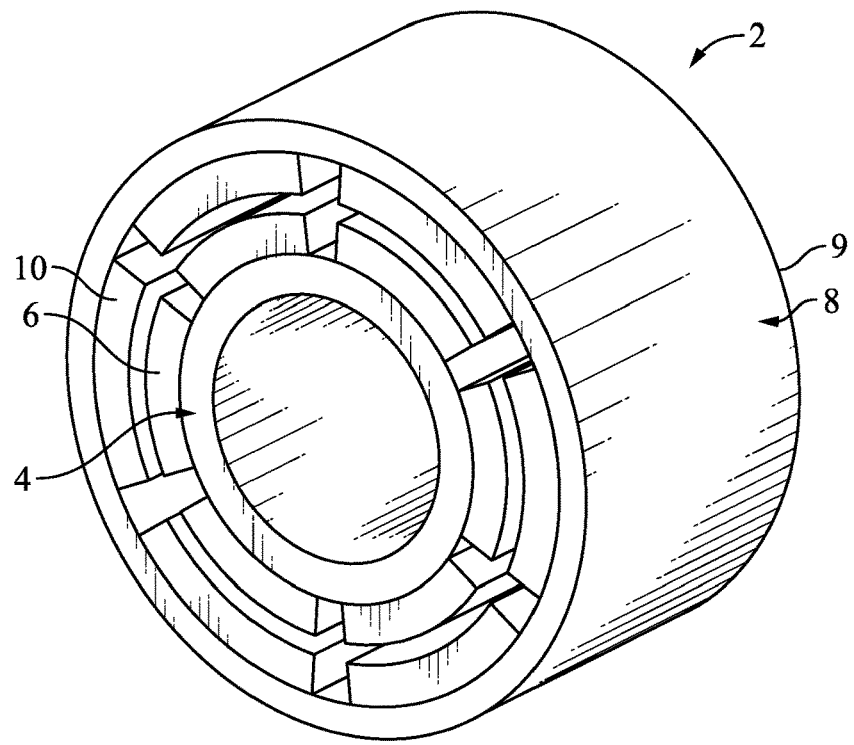
FIG. 1A is a schematic perspective view of a known rotary magnetic coupling with one section.
Figure 1B:
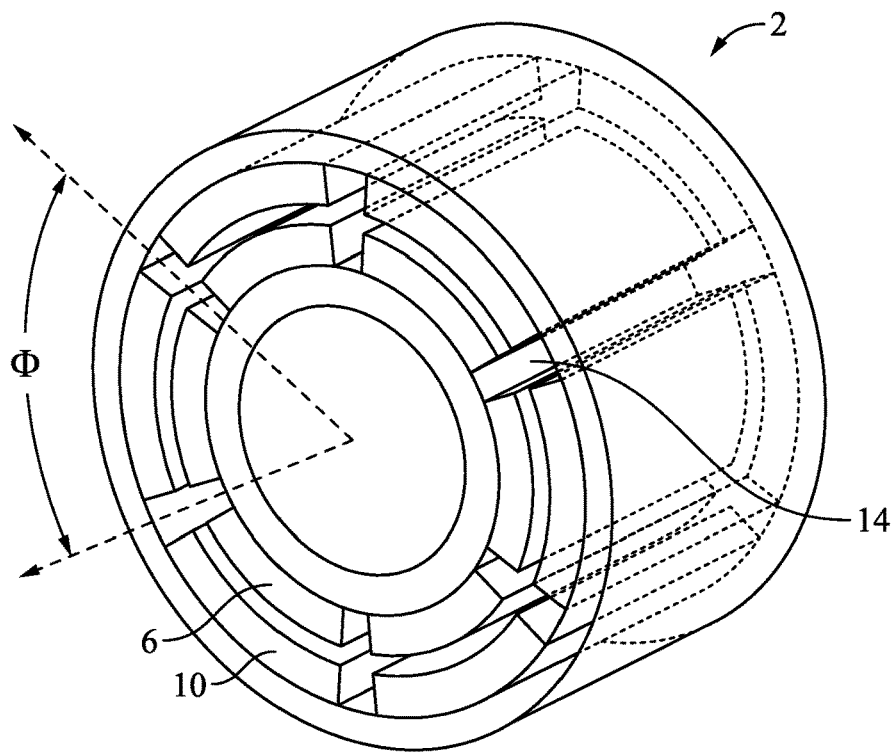
FIG. 1B is a schematic perspective view of internal components of the rotary magnetic coupling of FIG. 1A.

The Figures described above and the written description of specific structures and functions below are not presented to limit the scope of what Applicant has invented or the scope of the appended claims. Rather, the Figures and written description are provided to teach any person skilled in the art how to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The terms "top", "up", "upper", "upward", "bottom", "down", "lower", "downward", and like directional terms are used to indicate the direction relative to the figures and their illustrated orientation and are not absolute relative to a fixed datum such as the earth in commercial use.

The term "inner," "inward," "internal" or like terms refers to a direction facing toward a center portion of an assembly or component, such as longitudinal centerline of the assembly or component, and the term "outer," "outward," "external" or like terms refers to a direction facing away from the center portion of an assembly or component. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unitary fashion. The coupling may occur in any direction, including rotationally. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions. Some elements are nominated by a device name for simplicity and would be understood to include a system of related components that are known to those with ordinary skill in the art and may not be specifically described. Various examples are provided in the description and figures that perform various functions and are non-limiting in shape, size, description, but serve as illustrative structures that can be varied as would be known to one with ordinary skill in the art given the teachings contained herein. As such, the use of the term "exemplary" is the adjective form of the noun "example" and likewise refers to an illustrative structure, and not necessarily a preferred embodiment. Element numbers with suffix letters, such as "A", "B", and so forth, are to designate different elements within a group of like elements having a similar structure or function, and corresponding element numbers without the letters are to generally refer to one or more of the like elements. Any element numbers in the claims that correspond to elements disclosed in the application are illustrative and not exclusive, as several embodiments may be disclosed that use various element numbers for like elements.

The present invention is concerned with linearity of a produced torque response relative to angular displacement between inner and outer rotors having magnets, forming magnetic poles, and discloses a system and a method to reliably provide that the assembly functions as a linear magnetic torsional spring with a substantially wide operating region. The disclosure provides for multiple rotor sections of magnets in at least one of the inner and outer rotors wherein at least one rotor section of magnets forming magnetic poles is circumferentially offset by an offset angle from at least one other rotor section of magnets forming magnetic poles. In at least one embodiment, the magnetic torsional spring produces linear torque T, where $T=+/-k\ \theta$, k is the angular spring constant, and $\theta$ is the angular displacement. The torque responses from each rotor section when properly designed can cause a combined torque response with an extended linear portion to function as the linear magnetic torsional spring. The extended linear portion of the magnetic torsional spring can provide a useful radial angle of rotation for a linear torque to counteract a spring force applied to the rotor. The invention can be used in various applications where rotary equivalent responses of a linear spring are beneficial, such as controlling movement of a structure with a linear response.

For illustrative purposes, a 6-pole configuration with a 1.5 mm airgap will be discussed herein, unless otherwise noted, with the full understanding the invention applies to 2-pole, 4-pole-8-pole, 10-pole, 12-pole, and so forth. The graphs are normalized relative to a torque response at a magnetic arc ratio of 1.00 to provide relative comparisons between different magnetic arc ratios and demonstrate that the teachings described herein are applicable for such variations. Some of the graphs are expressed in degrees and some as a ratio of pole pitch. The ratio of pole pitch is simply the offset in degrees divided by the pole pitch in degrees. An offset of 30 degrees for a pole pitch of 60 degrees yields an offset ratio of 0.5 pole pitch. Similarly, a developed linear region is expressed as degrees in some graphs and as a ration of pole pitch in other graphs by dividing the linear region in degrees by the pole pitch. As is described in more details, once the ratio of the developed linear region is established (generally empirically) and converted from degrees into a ratio of a pole pitch, then the width of the developed linear region using embodiments with different numbers of poles can be calculated using the pole pitch ratio.

A rotor offset angle $\alpha$ can vary for any given magnetic arc ratio and the selected angles illustrated in many of the graphs are chosen empirically to provide the widest linear region for a given magnetic arc ratio. For example, a starting point could be a magnetic arc ratio of 0.67 that would provide a wide linear region using a rotor offset angle equal to 0.5 pole-pitch. However, a higher magnetic arc ratio towards 0.83 will give about 25% higher torque with a similar width of developed linear region with a rotor offset angle of 26 degrees (or 0.43 pole-pitch), that is, slightly less that the 0.5 pole-pitch of 30 degrees for a 6-pole assembly. The selected rotor offset angles are not constant for all magnetic arc ratios and have been chosen in the graphs and discussion merely as examples to provide a wide region of linear response for each individual magnetic arc ratio. Adjusting the rotor offset angle will affect the width and linearity of the developed linear-response region, as would be readily done to those with ordinary skill in the art given the teachings herein.

Empirically, the graphs show that best of these variations in terms of offering the widest width of linear torque region together with a high torque value is advantageously with a magnetic arc ratio in the range of 0.67-0.83 and more advantageously closer to 0.83. In at least one embodiment, the value of the maximum torque can then be matched to the application by altering the axial length of the assembly.

The teachings herein are applicable for a wide range of airgaps (the separation between inner and outer rotor), although such variations may benefit from a small adjustment to the rotor offset angle to re-establish an optimal performance due to unavoidable magnetic flux leakage with increasing airgap. As the airgap increases the magnetic flux-density reduces which reduces the torque, as is known to those in the art.

Figure 3A:
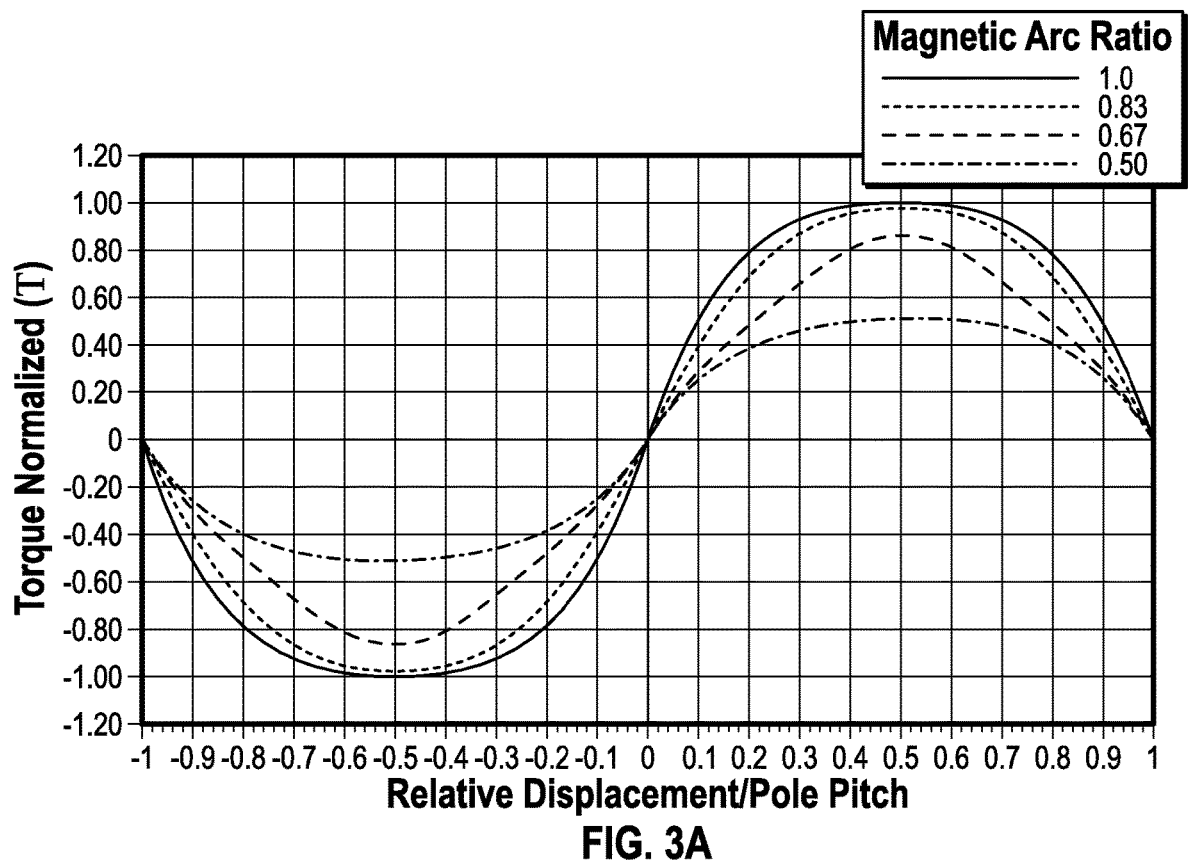
FIG. 3A is a schematic graph of torque response in relation to the relative radial angular displacement between inner and outer rotors of a single rotor section of multiple arc ratios.

FIG. 3A is a schematic graph of torque response in relation to the relative radial angular displacement between inner and outer rotors of a single rotor section. The X-axis represents a normalized circumferential displacement in terms of pole pitch and are therefore applicable to any number of magnetic poles. The Y-axis represents a normalized value of torque. The graph shows the torque response for four magnetic pole-width to pole-pitch ratios ("magnetic arc ratios") of 1.0, 0.83, 0.67, and 0.50.

Figure 3B:
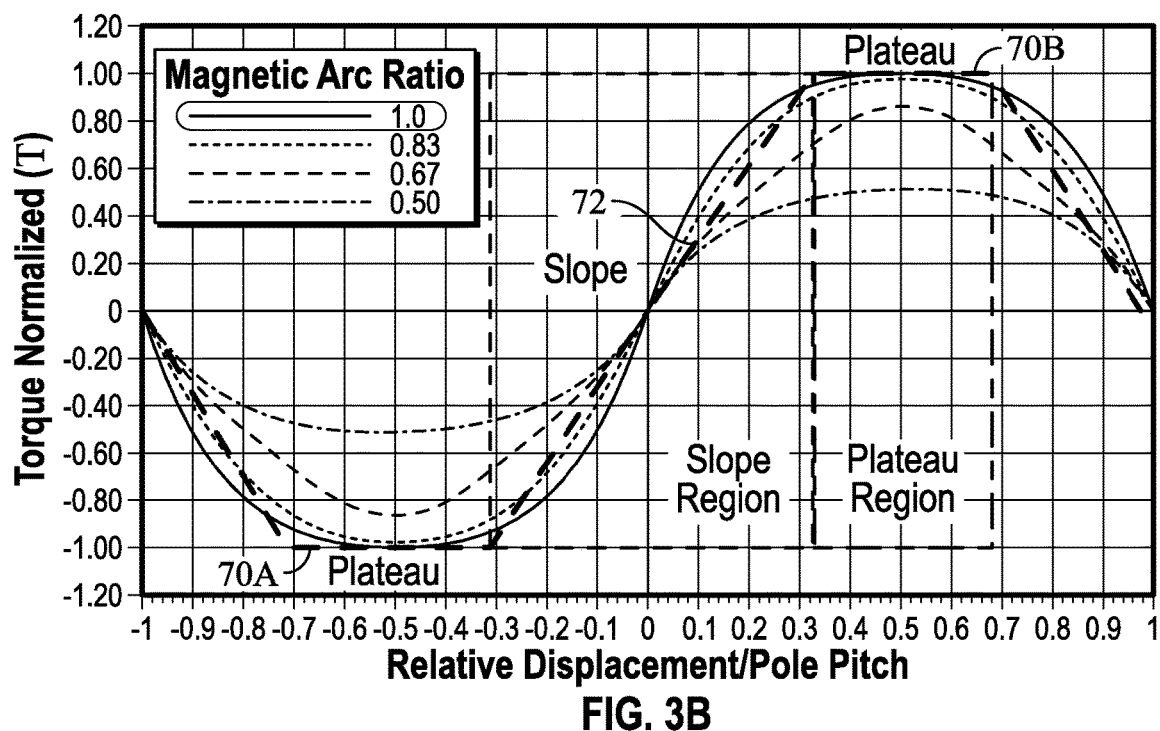
FIG. 3B is the graph of FIG. 3A characterized by a trapezoid having a plateau region and a slope region for a magnetic arc ratio of 1.0.

FIG. 3B is the graph of FIG. 3A characterized by a trapezoid having a plateau region and a slope region for a magnetic arc ratio of 1.0. The response profile can be approximated to a trapezoidal function with a plateau region 70A and 70B and a slope region 72. The torque plateau regions occur when there is little to no change in magnetic reluctance over a range of circumferential displacement, such as when magnet faces overlap each other or when circumferential gaps overlap each other. Therefore, an advantageous magnetic arc ratio can be obtained between 0.67 and 0.83 where a more triangular profile is obtained. In other words, the plateau is generally a region with the change in torque is minimal over a range of circumferential displacement. As can be seen in FIG. 3B, both wide circumferential gaps (for example, 0.50 ratio) and narrow circumferential gaps (for example, 0.83 or 1.0 for a gap of zero) can result in a relatively wide plateau region and a narrow slope region. With a large magnetic arc ratio, there is a wide plateau region and with a small magnetic arc ratio down to 0.5. There is also a wide plateau region.

Figure 3C:
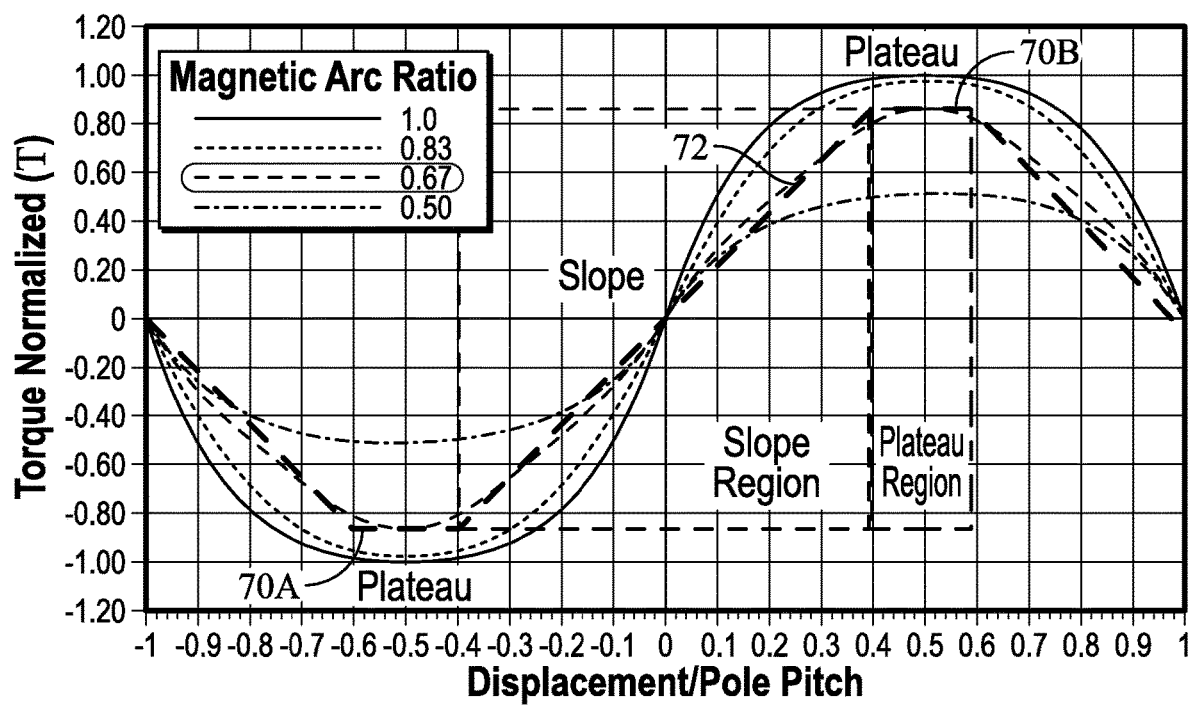
FIG. 3C illustrates the graph of FIG. 3A characterized by trapezoid having a plateau region and a slope region for a magnetic arc ratio of 0.67.

FIG. 3C illustrates the graph of FIG. 3A characterized by trapezoid having a plateau region and a slope region for a magnetic arc ratio of 0.67. The 0.67 ratio provides a wide slope region and narrow plateau region. As can be seen for in this example, a magnetic arc ratio between 0.67 and 0.85 will produce the widest sloped region.

Figure 4A:
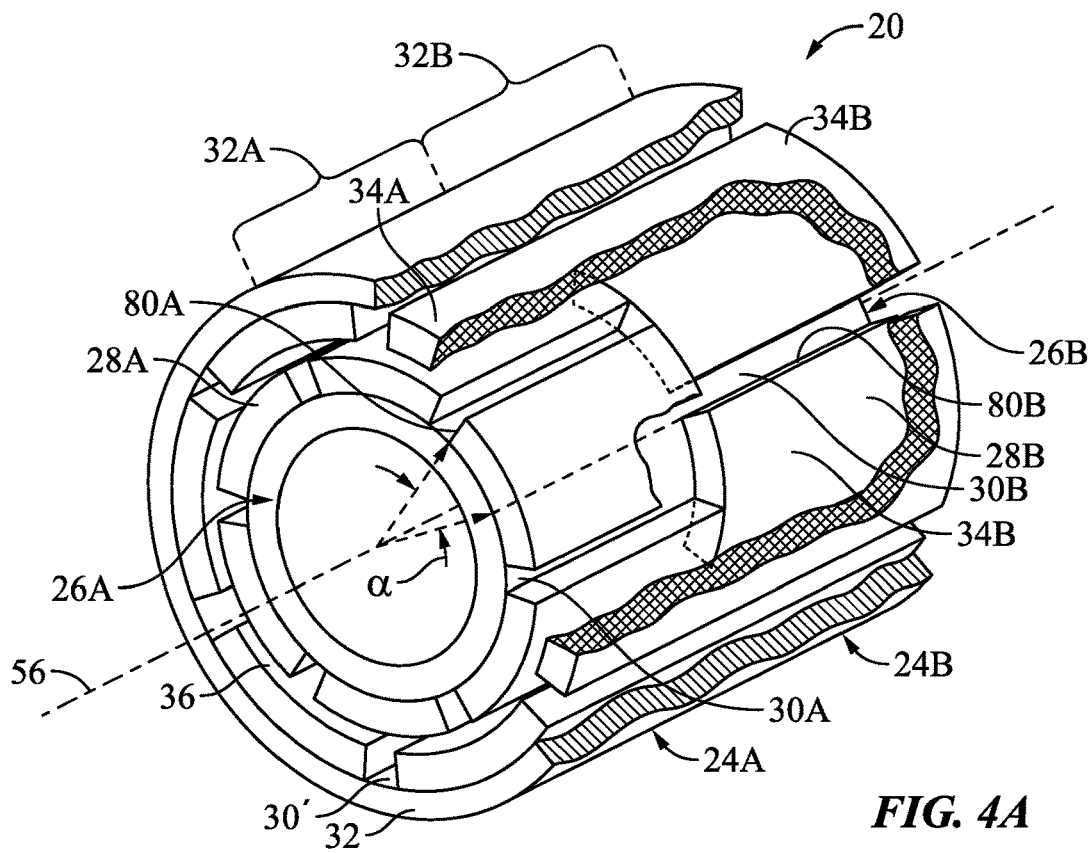
FIG. 4A is a schematic perspective view of an illustrative embodiment of a magnetic torsional spring with multiple sections according to the invention.

FIG. 4A is a schematic perspective view of an illustrative embodiment of a magnetic torsional spring according to the invention with multiple sections. In this example, a magnetic torsional spring 20 forms an assembly of magnetic elements, some portions of which are offset at a radial angle from other portions, to advantageously produce the developed linear torque response described herein. For purposes of explanation, the magnetic torsional spring can be considered a plurality of rotor sections. An assembly of inner and outer rotors, complete with their respective magnets, forming magnetic poles, constitutes a "rotor section" in the magnetic torsional spring. A "magnet" herein can be a single piece forming a magnetic pole or a combination of multiple magnet pieces collectively forming a magnetic pole. For larger magnets, practical fabrication of the latter structure may be more feasible.

An inner rotor 26 has an outer peripheral cylindrical surface 27 to which the inner rotor magnets 28 can be coupled, which in turn have an outer magnetic surface 29 and are disposed circumferentially around the outer peripheral cylindrical surface. An outer rotor 32 has an inner peripheral cylindrical surface 33 to which the outer rotor magnets 34 can be coupled, which in turn have an inner magnetic surface 35 and are disposed circumferentially around the inner peripheral cylindrical surface. A radial gap 36 generally exists between the inner rotor 26 and outer rotor 32, more specifically the inner rotor 26 is sized to fit inside an inside diameter of the outer rotor 32, and more specifically, with the radial gap between the outer magnetic surface 29 of the inner rotor and the inner magnetic surface 35 of the outer rotor. The radial gap 36 can be an air gap or have a member, generally non-magnetically conductive, disposed between the rotors to isolate the inner rotor from the outer rotor.

In this embodiment, two rotor sections are shown, that is, a first rotor section 24A and a second rotor section 24B with a portion of the second rotor section being angularly offset from the first rotor section (specifically, the respective magnetic poles) by a radial angular offset α. Each rotor section 24 of the magnetic torsional spring 20 includes an inner rotor 26 disposed radially at least partially within an outer rotor 32 and aligned along a common longitudinal axis 56. The terms "rotor section" and "rotor" are used broadly to include some embodiments in which one of the rotors is fixed (as would be a "stator" in the common parlance) and the other rotor rotates inside or outside the fixed rotor (depending on which rotor is fixed), as well as embodiments in which both rotors can rotate, where the various embodiments have the commonality of relative rotational motion between the rotors. Additional rotor sections are possible and generally the magnetic torsional spring would have an even number of rotor sections for reasons explained herein.

Inner rotor magnets 28 and/or outer rotor magnets 32 are arranged with a magnetization axis generally in radial directions. The term "radial" herein can indicate a true radial direction that radially aligns with the longitudinal axis, or a quasi-radial direction that is a radial approximation zone generally toward a central zone of the longitudinal axis, such as when magnetic pieces of a magnet are circumferentially distributed on a given radii. The magnets are generally equally distributed on the circumference of their supporting rotor back-iron material. In at least one embodiment, the magnets can be located in shallow pockets of the rotor back-iron material and further affixed by an appropriate coupling, including an adhesive. This embodiment shows a 6-pole magnetic arrangement with a total of 24 magnets and their respective magnetic poles. For the illustrated 6-pole embodiment having a 60° arc for a magnet, the radial angular offset a can be about one-half of the arc, or about 30°, although other angular offsets are possible. For example, if four rotor sections are used instead of two sections as illustrated, then the offset angle could generally occur in three offsets in between the four rotor sections. Therefore, the available pitch (here, 60°) could be divided into thirds resulting in an angular offset of 20° between the rotor sections, and so forth for other numbers of rotor sections. Other examples of radial angular offsets are described herein.

In the embodiment of FIG. 4A, the rotor section 24A includes an inner rotor 26A having inner rotor magnets 28A and an outer rotor 32A having outer rotor magnets 34A. The rotor section 24B includes an inner rotor 26B having magnets 28B and an outer rotor 32B having magnets 34B. Further, in this embodiment, inner rotor magnet faces 80B of the magnets 28B of the inner rotor 26B are angularly offset from inner rotor magnet faces 80A of the magnets 28A of the inner rotor 26A by an offset angle α. However, the magnets 34B of the outer rotor 32B are angularly aligned with the magnets 34A of the outer rotor 32A. In this embodiment, the outer rotors 32A and 32B and/or the magnets 34A and 34B can be combined into unitary structures. Further, in this embodiment, the outer rotor 32 with magnets 34 can axially span the inner rotor sections 26A and 26B. The magnets 34 can generally have a combined length of the inner rotor magnets 28A and inner rotor magnets 28B plus a length of any axial gap (not shown) longitudinally that may exist between the inner rotor sections. Generally, the inner rotors 26A and 26B can be coupled together so that the inner rotors can rotate in unison, with the inner rotors being angularly offset in this embodiment. Likewise, the outer rotors 32A and 32B can be coupled together, so that the outer rotors can rotate in unison. The rotors can rotate relative to each other to develop the torque response described herein.

Figure 2:
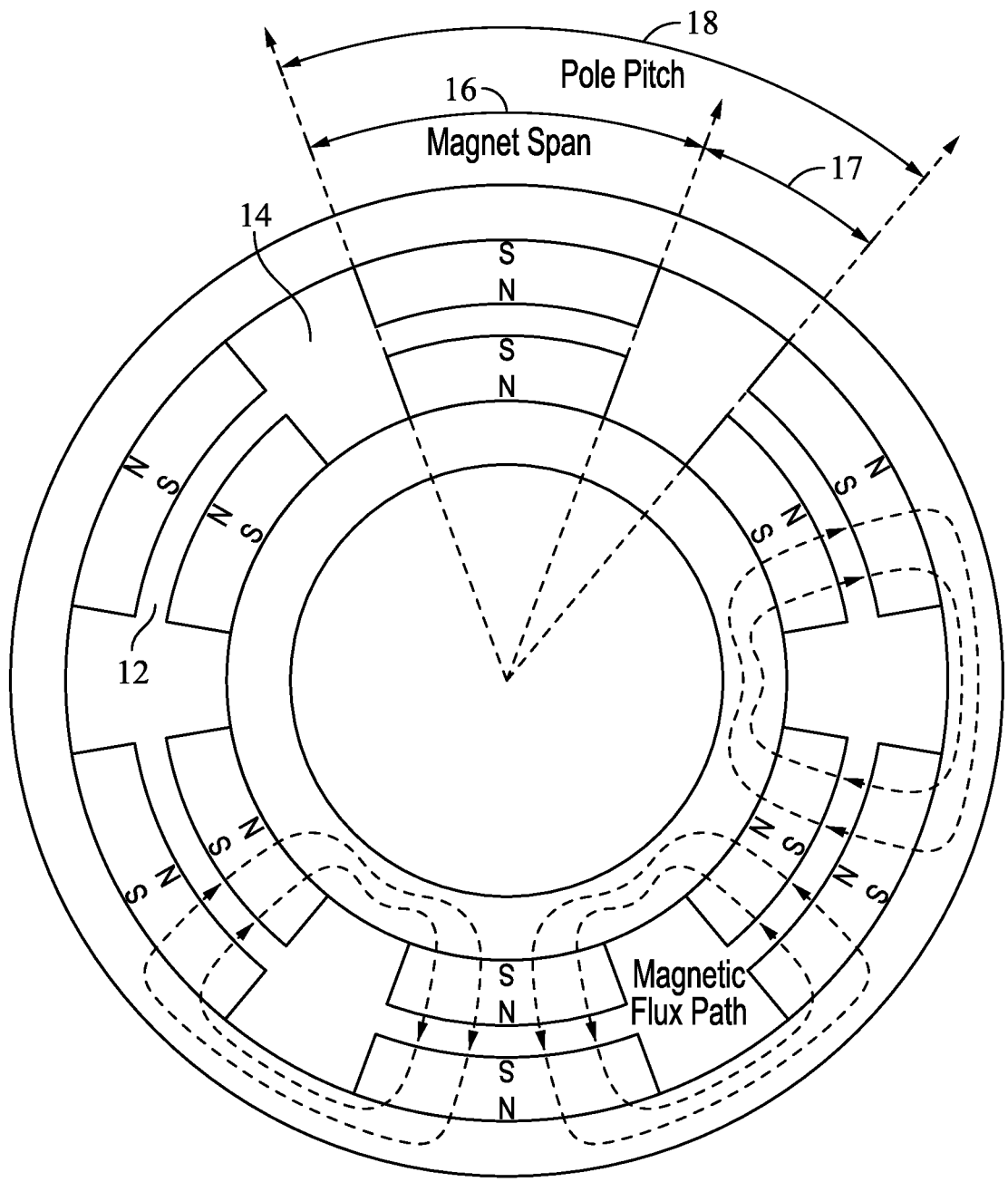
FIG. 2 is a schematic cross sectional diagram illustrating definitions of terms used herein and showing a general stable alignment of inner and outer rotors and illustrative magnet field paths.

The magnets can be separated by non-magnetic spacers or voids to create circumferential gaps 30 between the magnets. The magnets 28 and 34 of the inner and outer rotors can be circumferentially spaced apart by circumferential gaps 30, such as gaps 30A and 30B, for the inner rotor of the rotor sections and circumferential gaps 30' for the outer rotor of the rotor sections. The circumferential gaps have a gap width generally expressed in terms of degrees or ratios relative to pole pitch, as shown in FIG. 2.

The circumferential gaps 30 and 30' reduce the total magnetic torque. Thus, the traditional goal of maximizing the torque output from a rotary magnetic coupling teaches away from designing the circumferential gap 30 into the rotor that provides the larger linear response of the present invention. The width of the linear region can be designed relative to the torque needed for a particular application to increase or decrease the width of the circumferential gaps and/or the number of rotor sections that are used. Furthermore, the produced torque is linearly proportional with the axial length of a rotor section. The width of the linear region in terms of angular degrees can be designed relative to the required application, through selection of the number of magnetic poles as well as the adopted circumferential gap between them, to tailor a suitable linear region. The amplitude of the developed torque can be adjusted primarily through the axial length of each rotor section. The torque produced scales linearly with the axial length of rotor sections.

Figure 4B:
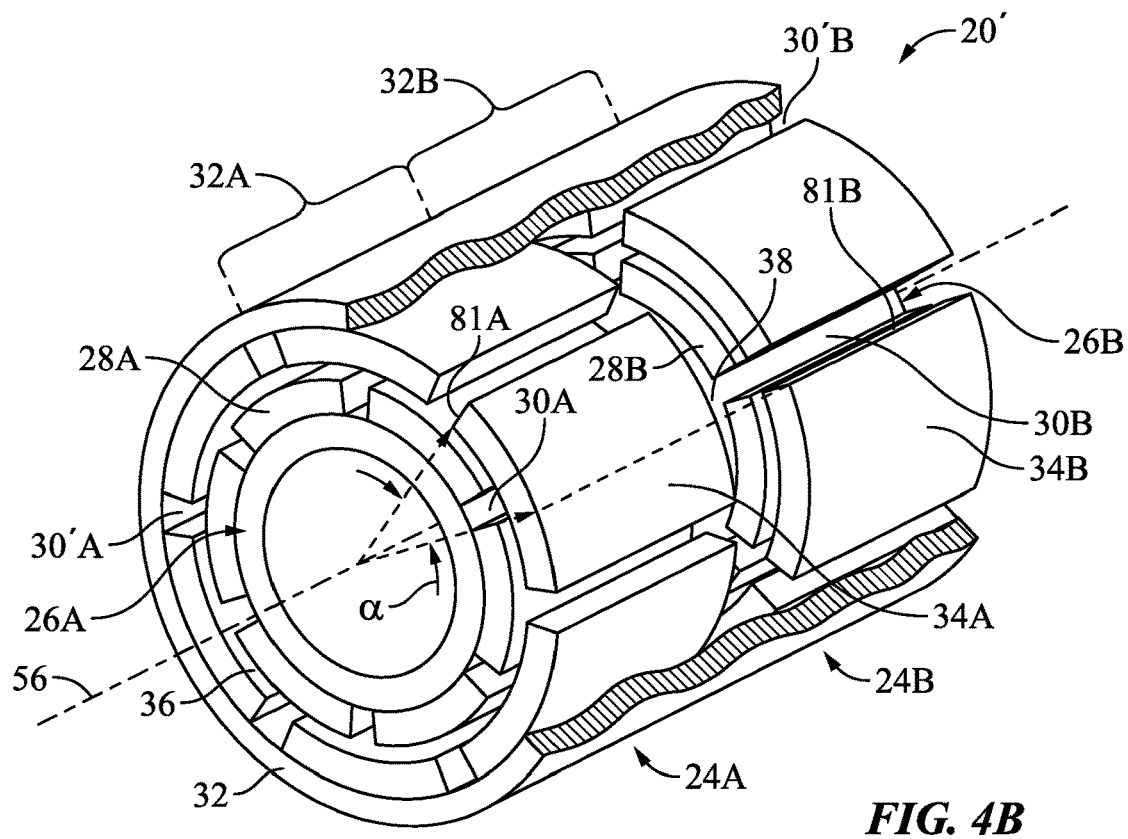
FIG. 4B is a schematic perspective view of an alternative embodiment of the magnetic torsional spring in FIG. 4A.

The magnetic torsional spring 20 may include an axial gap 38 along the longitudinal axis of various lengths between the rotor sections, as shown in the embodiment of FIG. 4B. The back-iron material of each rotor may be continuous across rotor sections or may include a break at the limit or boundary of each section.

FIG. 4B is a schematic perspective view of an alternative embodiment of the magnetic torsional spring in FIG. 4A. The embodiment in FIG. 4B switches the components with an angular offset angle α from the inner rotors 26 to the outer rotors 32 for the magnetic torsional spring 20'. In contrast to the embodiment of FIG. 4A, outer rotor magnet faces 81B of the magnets 34B of the outer rotor 32B of the rotor section 24B are angularly offset with outer rotor magnet faces 81A of the magnets 34A of the outer rotor 32A of the rotor section 24A by the angle α. The magnets 34A can be spaced apart by a circumferential gap 30'A. The magnets 34B can be spaced apart by a circumferential gap 30'B. The magnets 28B of the inner rotor 26B of the rotor section 24B are angularly aligned with the magnets 28A of the inner rotor 26A of the rotor section 24A. The magnets 28A can be spaced apart by a circumferential gap 30A, and the magnets 28B can be spaced apart by a circumferential gap 30B. In at least some embodiments, the circumferential gaps 30 and 30' are substantially equal between the rotor sections and between the inner and outer rotors of each section.

This embodiment also illustrates an axial gap 38 between the outer rotor sections 32A and 32B. The axial gap 38 may be required for other design reasons, but its presence or not has a negligible effect on performance for the linear region.

While this embodiment shows aligned but separated inner rotors 26A and 26B, the inner rotors can be unitary with magnets 28 that axially span the outer rotor sections 32A and 32B.

The magnet 28 can generally have a combined length of an outer rotor magnet 34A and outer rotor magnet 34B plus a length of any axial gap 38 that may exist between the outer rotors.

A magnetic field exists between the magnet faces such that depending on alignment, the resulting magnetic field can produce an attracting or repelling force between magnetic poles on the inner rotor 26 and outer rotor 32. When at least one of the rotors is rotated, magnetic attraction or repulsion forces acting tangentially on the magnetic pole surfaces within the radial gap 36 between the two rotors produce a torque moment acting with or against the direction of rotation.

The invention is not limited to two rotor sections and the effect may be extended or modified with the combination of a plurality of rotor sections of interacting inner and outer rotors, with any even number of circumferential magnets on each and where the magnets of at least one inner or outer rotor in one rotor section are offset from the magnets of at least one other respective inner or outer rotor in another rotor section, and the magnets of the interacting outer or inner rotor being aligned with at least one other interacting outer or inner rotor, respectively. Generally, the number of rotor sections offset from one another will be an even number to advantageously allow the complementary addition of even numbers of offset torque curve slopes for a linear region developed by at least a pair of rotor sections with an appropriate angular offset between them, as described herein. Generally, the angular offset between the magnet positions of a pair of rotor sections is applied to either the inner rotor or outer rotor of each, but generally not both.

The magnet radial thickness and the resulting back-iron thickness of each rotor, along with the radial gap, affects the operating magnetic flux density in the magnetic circuit. Increasing the magnet thickness will produce an increase in the operating flux density and will also generally require an increase in back-iron thickness for the same number of magnets poles and radial gap. Increasing the radial gap will reduce the magnetic flux density and hence torque, which is approximately dependent of the square of the operating flux density in the radial gap between the rotors. The inventive provision of a linear response is relatively insensitive to the radial gap and magnet thickness and will continue to work, albeit with the maximum torque per unit axial-length of rotor being largely defined by the magnet thickness, magnet material, and radial gap.

The maximum produced torque is linear proportionally related to axial length. Therefore, the axial length of the magnetic torsional spring (or more specifically, the axial length of the magnetic poles on the magnetic torsional spring) may be used as a variable for tuning the value of maximum torque of the magnetic torsional spring.

Figure 5A:
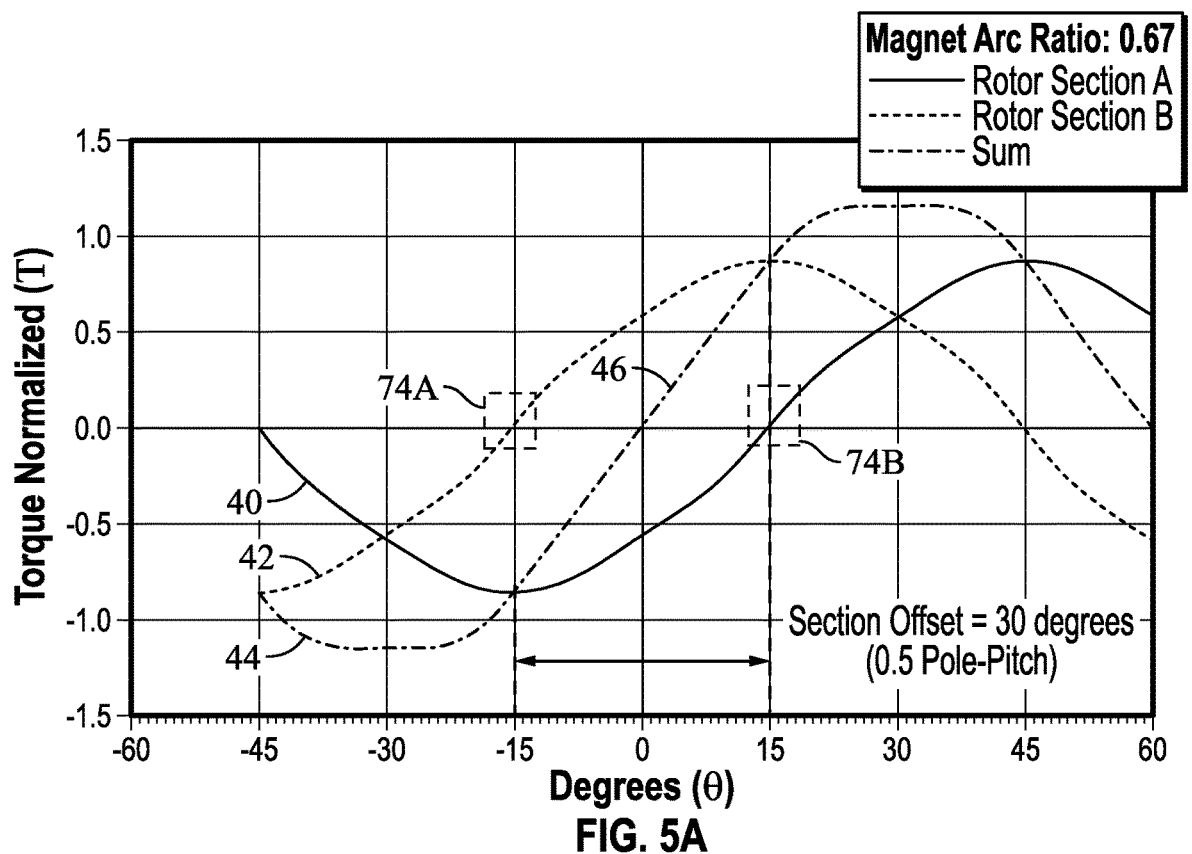
FIG. 5A is a schematic graph of torque response relative to radial angular displacement of the magnetic torsional spring having a magnetic arc ratio of 0.67, similar to the embodiment of FIGS. 4A and 4B obtained from two rotor sections, with one having offset magnetic poles from the other.
Figure 5B:
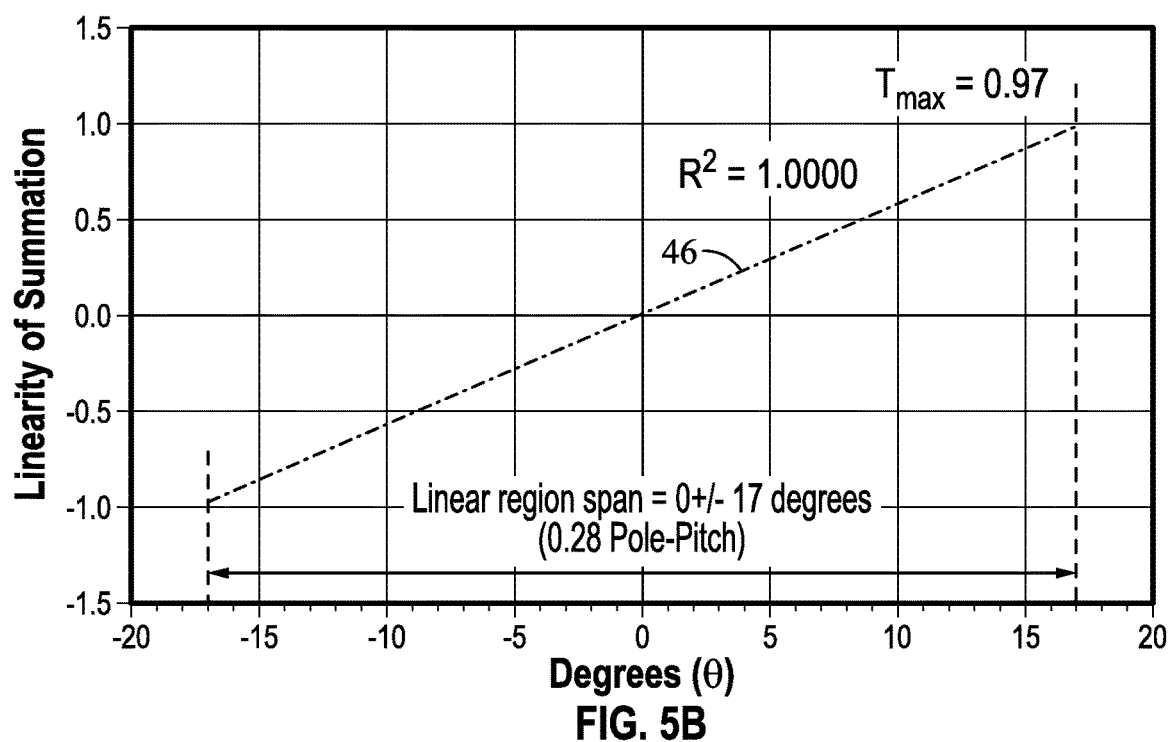
FIG. 5B is a schematic enlarged graph along a linear portion of torque response of FIG. 5A.

FIG. 5A is a schematic graph of torque response relative to radial angular displacement of the magnetic torsional spring having a magnetic arc ratio of 0.67, similar to that shown in FIGS. 4A and 4B obtained from two rotor sections, with one having offset magnets from the other. FIG. 5B is a schematic enlarged graph along a linear portion of torque response of FIG. 5A. For illustrative purposes as referenced above, FIGS. 5A and 5B show torque responses for a 6-pole rotor section with 1.5 mm radial air gap between the inner and outer rotors, and in this instance with a magnetic arc ratio is 0.67 and a radial angular offset between the two rotor sections of 30° (0.5 pole pitch). Advantageously, the summation of separate torque responses caused by the offset rotor sections, that is, at least two rotors axially aligned but angularly offset yields a developed width linear response that is significantly expanded from either of the torque responses of the individual rotor sections. This expanded width linear response is in contrast to torque responses of a single rotor pair with traditional magnets with no offsets that yields a small linear region 74A and 74B for each of the rotor sections individually (in this example of about +/−6 degrees each). In this example, the developed linear region is about +/−17 degrees (0.23 pole pitch). The summation mainly is useful in the slope region, whether or not it already (coincidentally) contains a small linear region in the individual torque response, to produce an extended region of linear torque response. In some embodiments, such as shown and described below in FIGS. 7A-7D, there is no discernable initial linear region in the individual torque responses, yet the summation of the responses provides a wide linear region.

Specifically, to achieve a wide region of linear torque response, it is advantageous to extend the width of the slope region with an appropriate selection of the magnetic arc ratio. A first rotor section with its inner and outer rotors and magnetic poles and gaps produces a representative torque displacement response 40. A second rotor section that is axially aligned along a rotational longitudinal axis with the first rotor section has a torque displacement response 42. The second rotor section has magnetic poles on a rotor (inner or outer) that is angularly offset at the angle α from a corresponding rotor on the first rotor section, as described above. As mentioned, the circumferential gap may permit a narrow region of linear torque variation to be created from each single rotor section. Both torque displacement responses 40 or 42 have a relatively small linear portion 74A and 74B, respectively. However, the combined values of the torque displacement responses 40 and 42 are shown as the combined torque displacement response 44, resulting in a much wider linear torque system response of the magnetic torsional spring. Due to the offset angle between rotor magnetic poles, a linear portion 46 of the torque response 44 is significantly wider than the linear portions of either of the rotor sections without the summation caused by the offset. The circumferential gaps 30 between the magnetic poles help provide a more gradual change to the magnetic field as the magnetic poles on one rotor rotate radially past magnetic poles on the other rotor in a given rotor section.

Figure 6A:
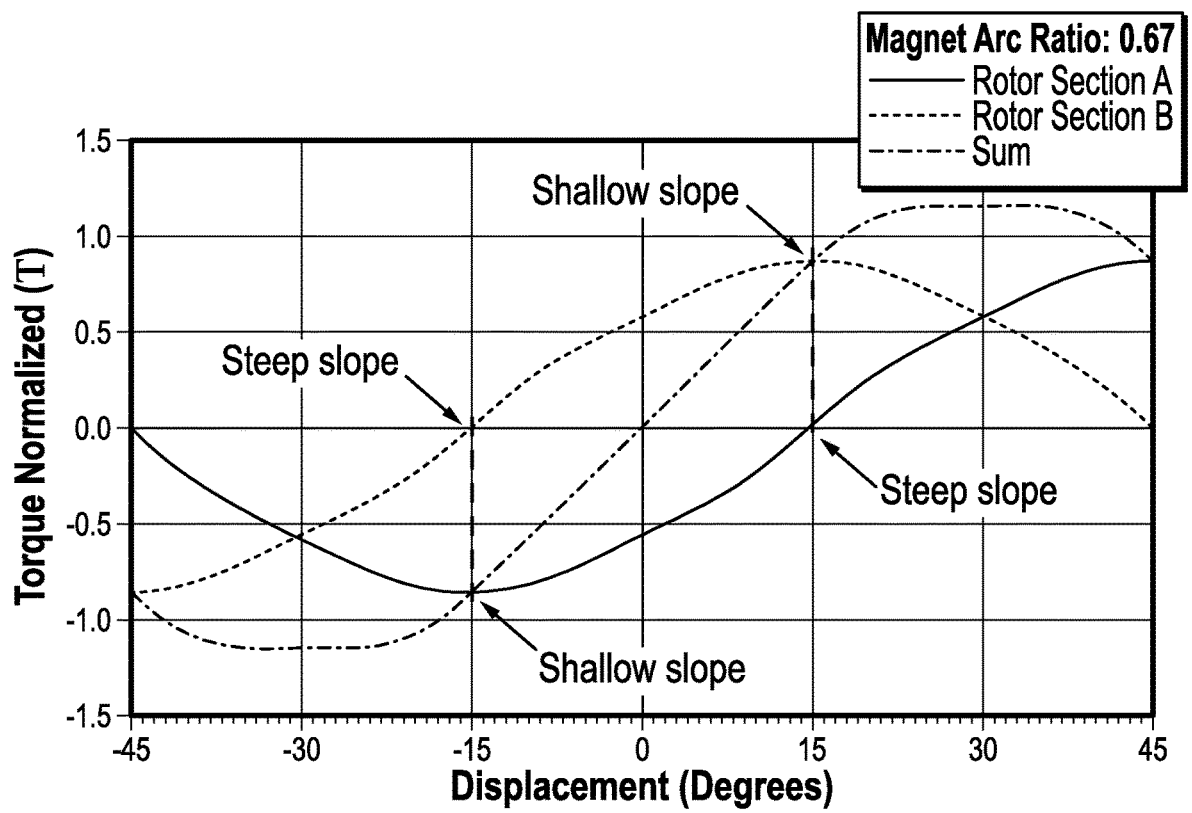
FIG. 6A is a representative schematic graph of the torque response relative to radial angular displacement shown in FIG. 5A, illustrating contrasting slopes.
Figure 6B:
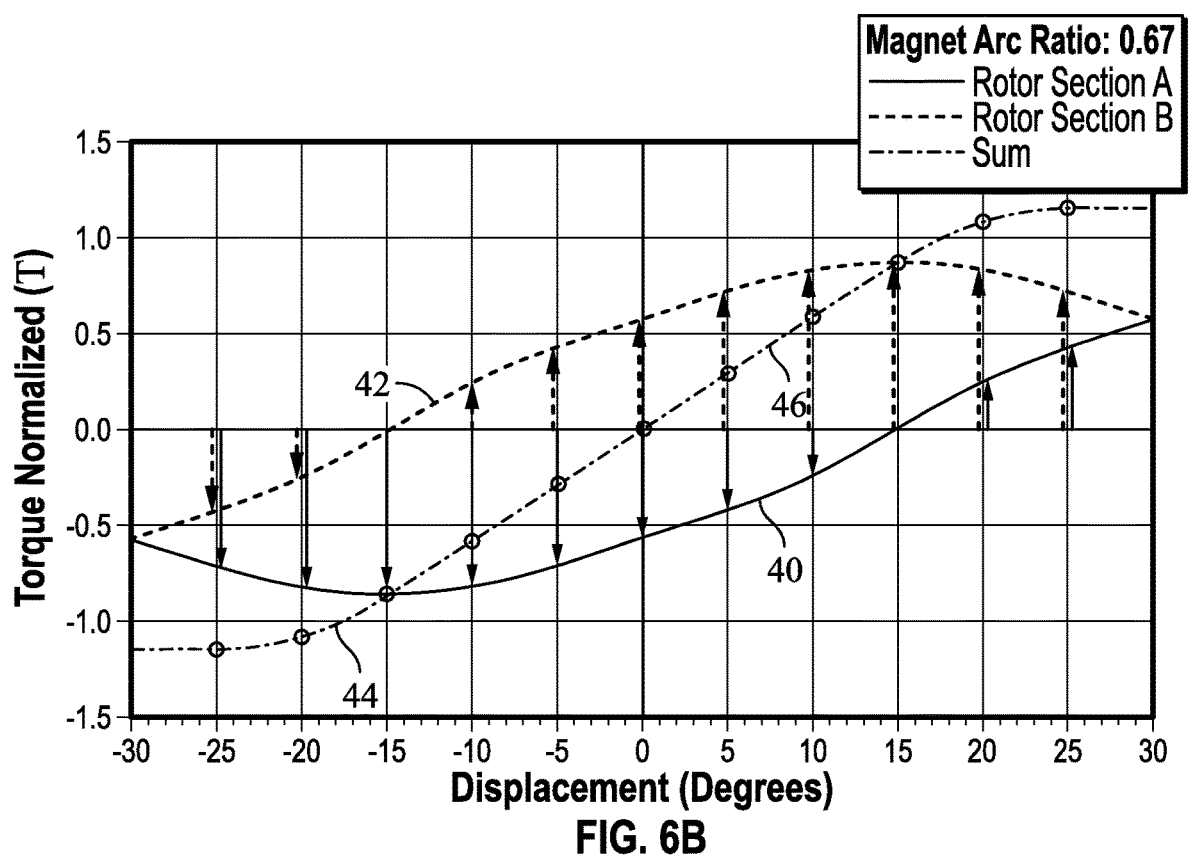
FIG. 6B is a representative schematic graph of the torque response relative to radial angular displacement shown in FIG. 5A and FIG. 7A, illustrating summation vectors between torque responses of rotors with an offset therebetween.

FIG. 6A is a representative schematic graph of the torque response relative to radial angular displacement shown in FIG. 5A, illustrating contrasting slopes. FIG. 6B is a representative schematic graph of the torque response relative to radial angular displacement shown in FIG. 5A, illustrating summation vectors between torque responses of rotors with an offset therebetween. The profile of the generated torque-vs-displacement curve exhibits an inverted symmetry along its slope. When two torque responses of two rotor sections (or another even number) with an appropriate offset are summed for a system result, a region of increasing torque on a first rotor section can be effectively complemented by a region of decreasing torque from a second rotor section with an offset rotor (specifically the o) or vice versa, the slope of the sum torque remains constant over the identified linear portion. In this way, the present invention combines in a complementary manner, a number of regions essentially of non-linear torque through magnetic poles positioned at offset angles α relative to adjacent sections to provide a wider extended region of the linear torque over a larger radial angular displacement between the rotors sections.

Thus, in FIG. 6A, when a first rotor torque response 40 is shallow, the other rotor torque response 42, being offset, is steep and when the first rotor torque response 40 is steep, the other rotor torque response 42 is shallow. There is little or no perceivable linear regions in the torque profiles from individual rotor sections. Further, as shown in FIG. 6B, the positive and negative values relative to the X-axis of the torque responses by the first and second rotor sections in solid and dashed arrows, respectively, are summed at a given angular displacement to yield the combined torque response. For example and without limitation, the circumferential gaps can typically be about 20%+/−5% of the possible arc to create a wide slope region and the magnetic poles can be about 80%+/−5%, although the percentages can vary depending on the desired width of the linear torque region and desired torque. In the illustrated 6-pole embodiments shown in FIGS. 4A and 4B, a nonlimiting example of the 60° available arc for a magnet 28 or 34 and circumferential gap 30 would be about 50° (83.3%) for the magnetic pole and about 10° (16.7%) for the gap. A larger gap percentage reduces the space available for a magnetic pole and generally results in the magnetic torsional spring generating less torque. Without limitation, a range for the magnetic pole width can usefully be from 50% to 100%, inclusive, of the available magnetic pole pitch and any increment therebetween by integers and fractions thereof.

The combination (stacking) of rotor sections with an appropriate angular offset applied between them creates a wider region of linear torque response according to the relative angular displacement of the rotors, with the result that the device can act as a linear torsional spring in that region with Torque, $T=+/-k\,\theta$ where k is the spring constant and $\theta$ is the angular displacement of the rotors. Depending on the chosen operating point, the magnetic torsional spring can provide either a positive or negative linear torque response in relation to angular displacement. The optimal angular offset between the rotors of the rotor sections can depend on the width of the slope region obtained from a single rotor assembly, which is primarily dependent on the magnetic pole arc ratio, with some secondary effects from magnetic flux leakage and air gap. The angular offset is generally not greater than half of the circumferential width of the slope-region of the torque response profile as obtained from a single rotor assembly, because the complementary summation of individual torque responses works on the addition of complementary slope region sections, which may extend to a slope region plus part of a plateau region. An advantageous range of magnetic pole to arc ratio for a wide slope region is in the range between 0.67 and 0.85, although values higher and lower than this range will still function, albeit with narrower slope regions and consequently narrower developed regions of linear torque responses.

Figure 7A:
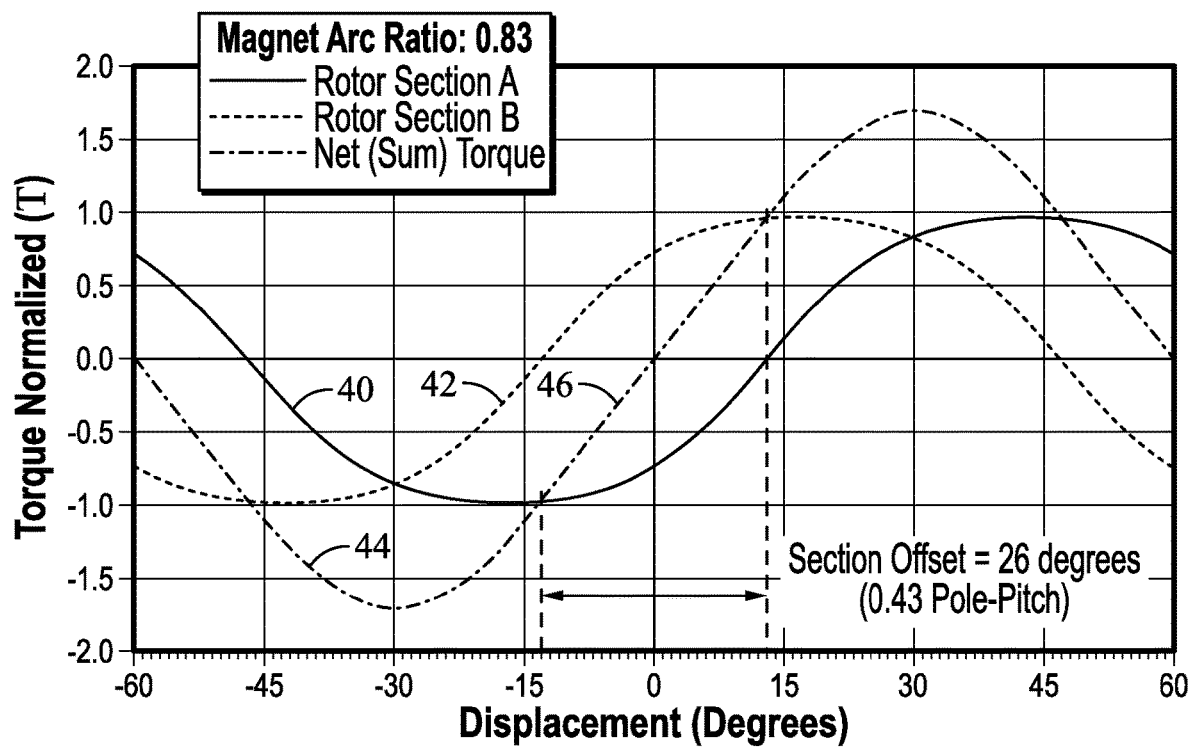
FIG. 7A is a schematic graph of torque response relative to radial angular displacement of the magnetic torsional spring similar to the embodiment of FIGS. 4A and 4B but with a magnetic arc ratio of 0.83.
Figure 7B:
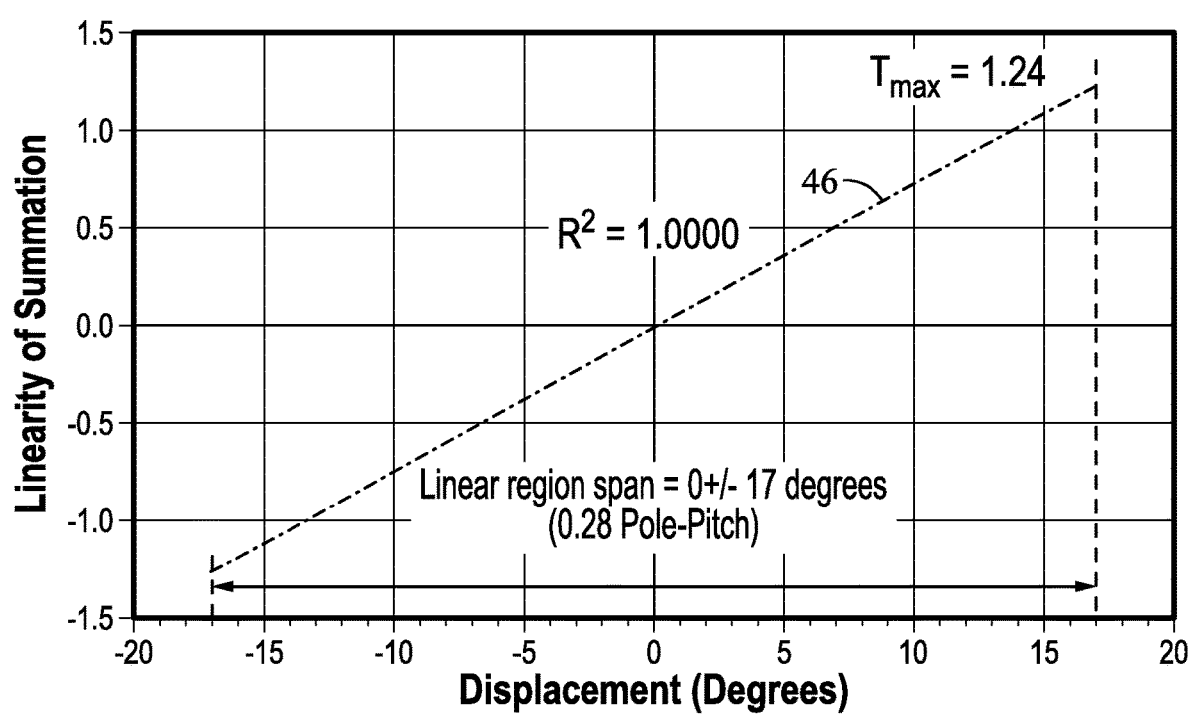
FIG. 7B is a schematic enlarged graph along a linear portion of torque response of FIG. 7A.
Figure 7C:
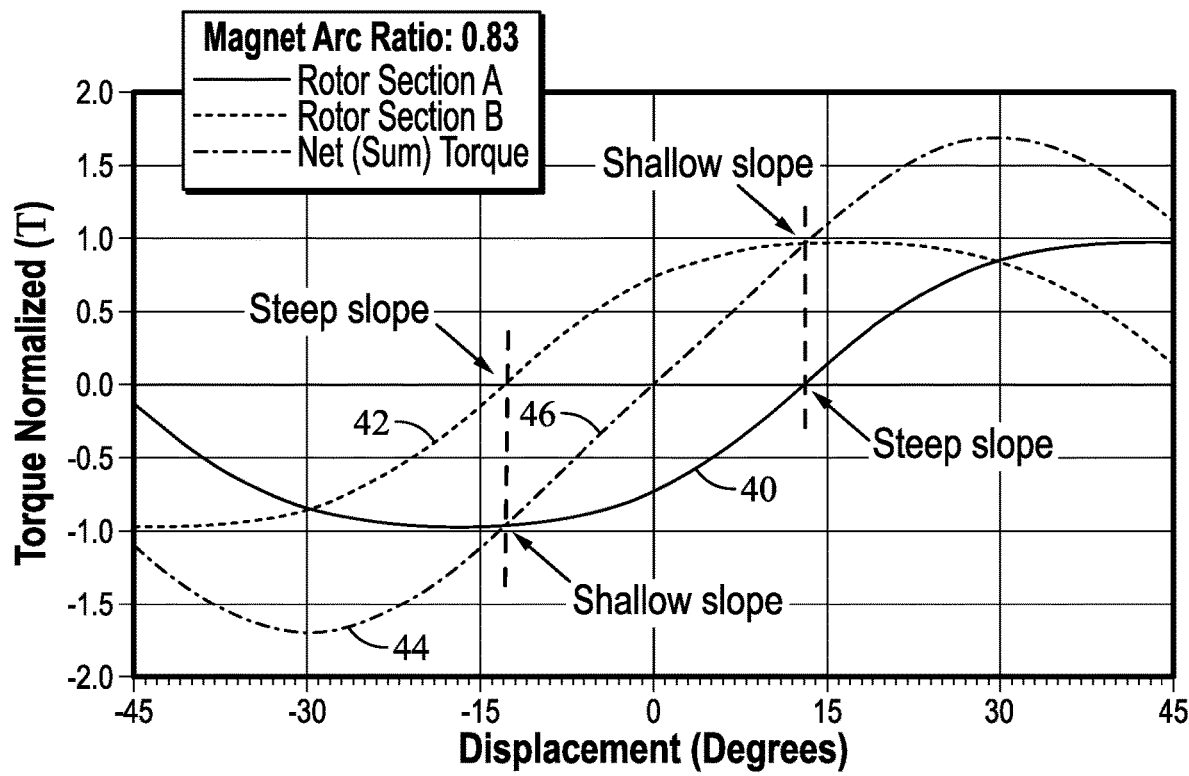
FIG. 7C is representative schematic graph of the torque response relative to angular displacement shown in FIG. 7A, illustrating contrasting slopes.
Figure 7D:
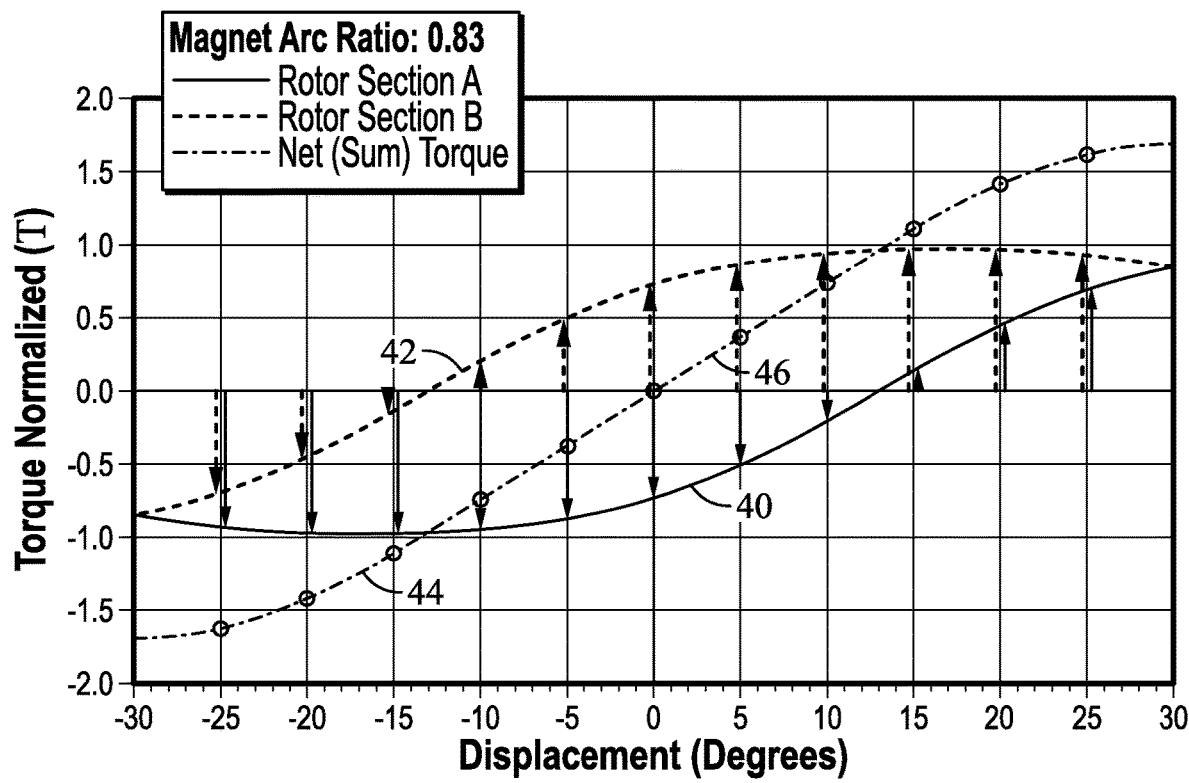
FIG. 7D is a representative schematic graph of the torque response relative to radial angular displacement shown in FIG. 7A, illustrating summation vectors between torque responses of rotors with an offset therebetween.

FIG. 7A is a schematic graph of torque response relative to radial angular displacement of the magnetic torsional spring similar to the embodiment of FIGS. 4A and 4B, but with a magnetic arc ratio of 0.83. FIG. 7B is a schematic enlarged graph along a linear portion of torque response of FIG. 7A. FIG. 7C is representative schematic graph of the torque response relative to angular displacement shown in FIG. 7A, illustrating contrasting slopes. FIG. 7D is a representative schematic graph of the torque response relative to radial angular displacement shown in FIG. 7A, illustrating summation vectors between torque responses of rotors with an offset therebetween. In this example, the magnetic torsional spring has a 26° angular offset (0.43 pole pitch) between rotor sections, and a magnetic arc ratio of 0.83. The individual torque displacement curves for the two rotor sections each exhibit no perceivable linearity and yet the summation of their torques, with the appropriate radial, angular offset between the two rotor sections, is able to provide a region of linear response extending about +/−17 degrees (0.28 pole pitch) in each direction of displacement. The separate rotor torque responses 40 and 42 sum to produce the combined torque response 44. The linear portion 46 is somewhat narrower and steeper compared to the linear response 46 in FIGS. 5A and 5B with a magnetic arc ratio of 0.67.

Figure 8A:
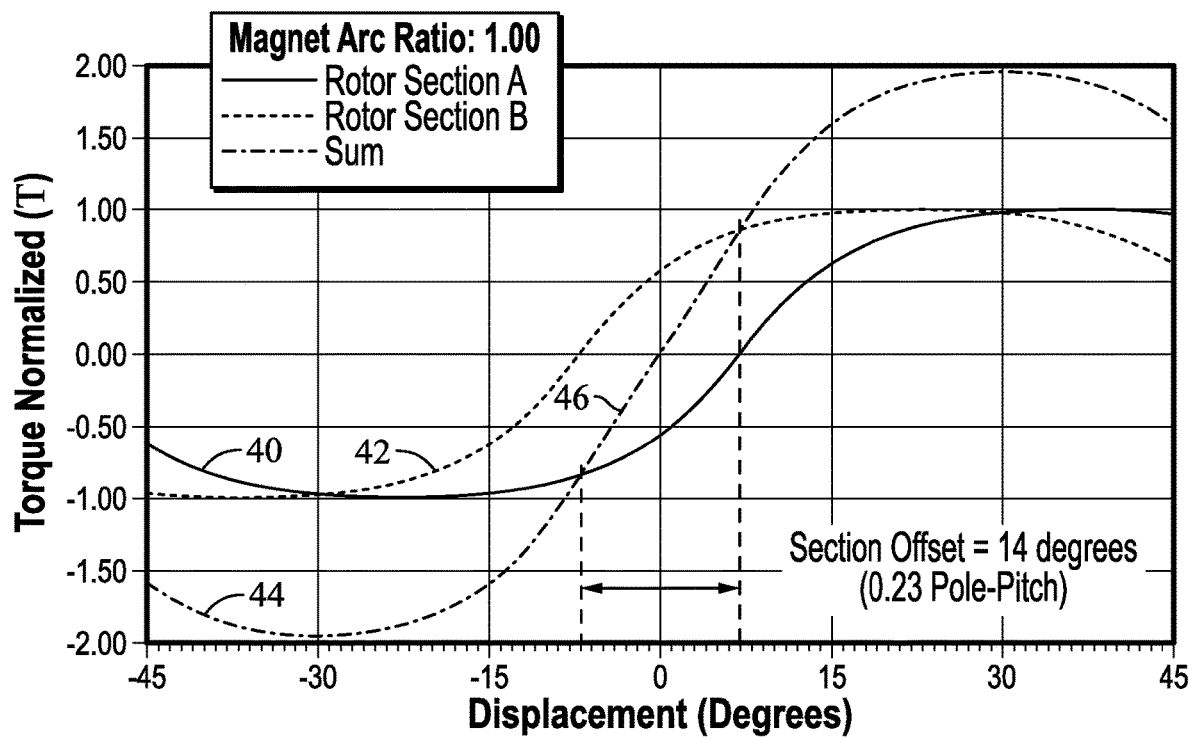
FIG. 8A is a schematic graph of torque response relative to radial angular displacement of the magnetic torsional spring similar to the embodiment of FIGS. 4A and 4B, but with a magnetic arc ratio of 1.0.
Figure 8B:
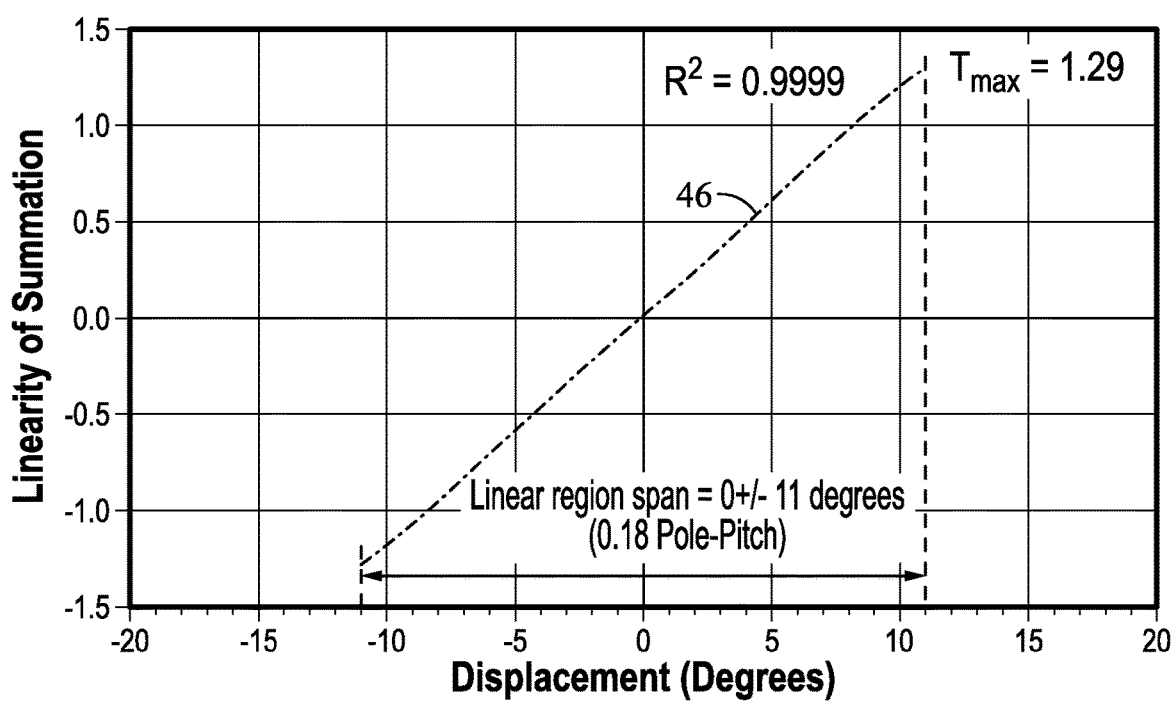
FIG. 8B is a schematic enlarged graph along a linear portion of torque response of FIG. 8A.

FIG. 8A is a schematic graph of torque response relative to radial angular displacement of the magnetic torsional spring similar to the embodiment of FIGS. 4A and 4B but with a magnetic arc ratio of 1.0. FIG. 8B is a schematic enlarged graph along a linear portion of torque response of FIG. 8A. The embodiment has a 14 degrees angular offset. A magnetic arc ratio of 1.0 or close to 1.0 will exhibit a relatively wide plateau region for the individual torque responses 40 and 42. The magnetic arc ratio will result in a combined torque response 44 having a narrower linear portion 46 compared for example to FIGS. 5A and 5B. Hence, the available offset angle will itself be greatly reduced and the resulting linear region will also be narrower. The applied offset between rotor sections may be less than the optimal offset and linearity will be maintained in this case, over a narrower operating span and with greater torque. However, it is understood that if the applied offset is greater than the optimal offset, then substantial linearity will be lost.

Thus, the combination of rotor sections with an angular offset between them produces a significantly extended developed region of linearity, and can produce a higher net torque. Such a region would otherwise not be possible with a simple one rotor section of regular-shaped, arced, magnets. As shown in FIG. 5B, the level of linearity between +/−17 degrees (0.28 pole pitch) is about 100.00% and in FIG. 8B, between +/−11% (0.18 pole pitch) is about 99.99%. While the level of linearity can vary for different applications, linearity herein means a linearity of at least 90%, advantageously at least 95%, and more advantageously at least 99% up to 100% inclusive, and any percentages and fractions of percentages therebetween.

Figure 9A:
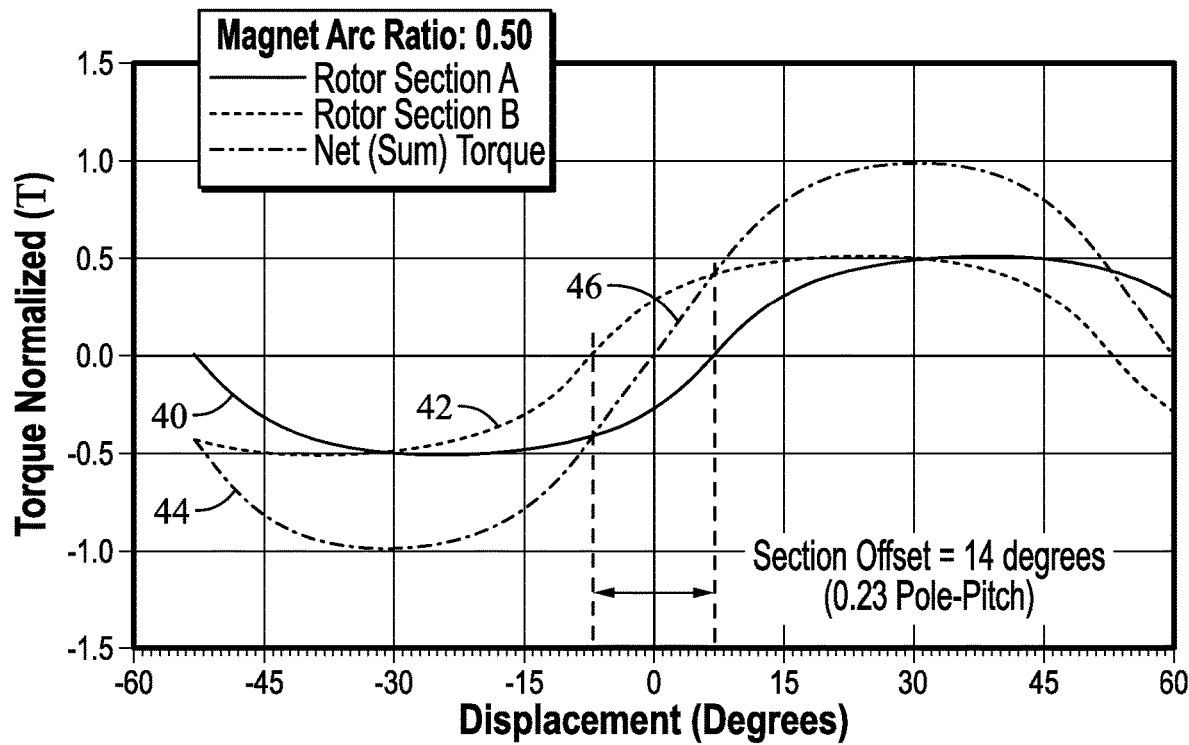
FIG. 9A is a schematic graph of torque response relative to radial angular displacement of the magnetic torsional spring similar to the embodiment of FIGS. 4A and 4B, but with a magnetic arc ratio of 0.50.
Figure 9B:
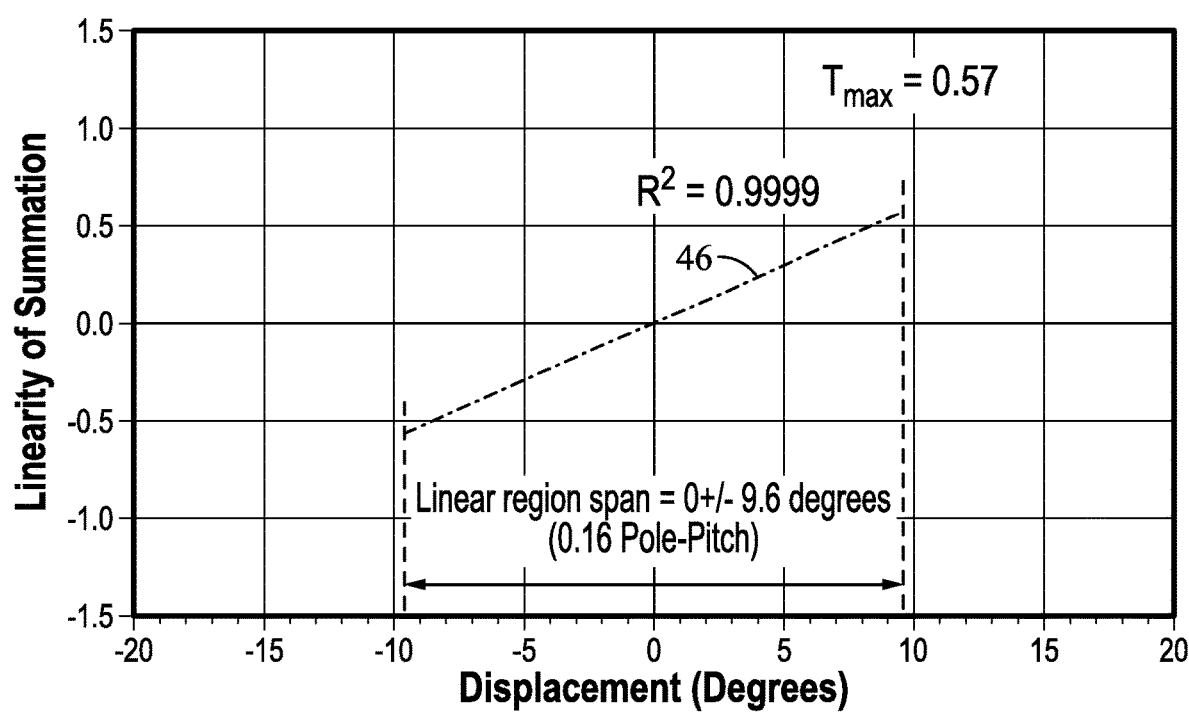
FIG. 9B is a schematic enlarged graph along a linear portion of torque response of FIG. 9A.

FIG. 9A is a schematic graph of torque response relative to radial angular displacement of the magnetic torsional spring similar to the embodiment of FIGS. 4A and 4B, but with a magnetic arc ratio of 0.5. FIG. 9B is a schematic enlarged graph along a linear portion of torque response of FIG. 9A. The embodiment has a 14 degrees angular offset (0.23 pole pitch). The magnetic arc ratio will result in a combined torque response 44 having a narrower linear portion 46 of +/9.6 degrees (0.16 pole pitch) compared for example to FIGS. 5A and 5B and FIGS. 8A and 8B.

Figure 10A:
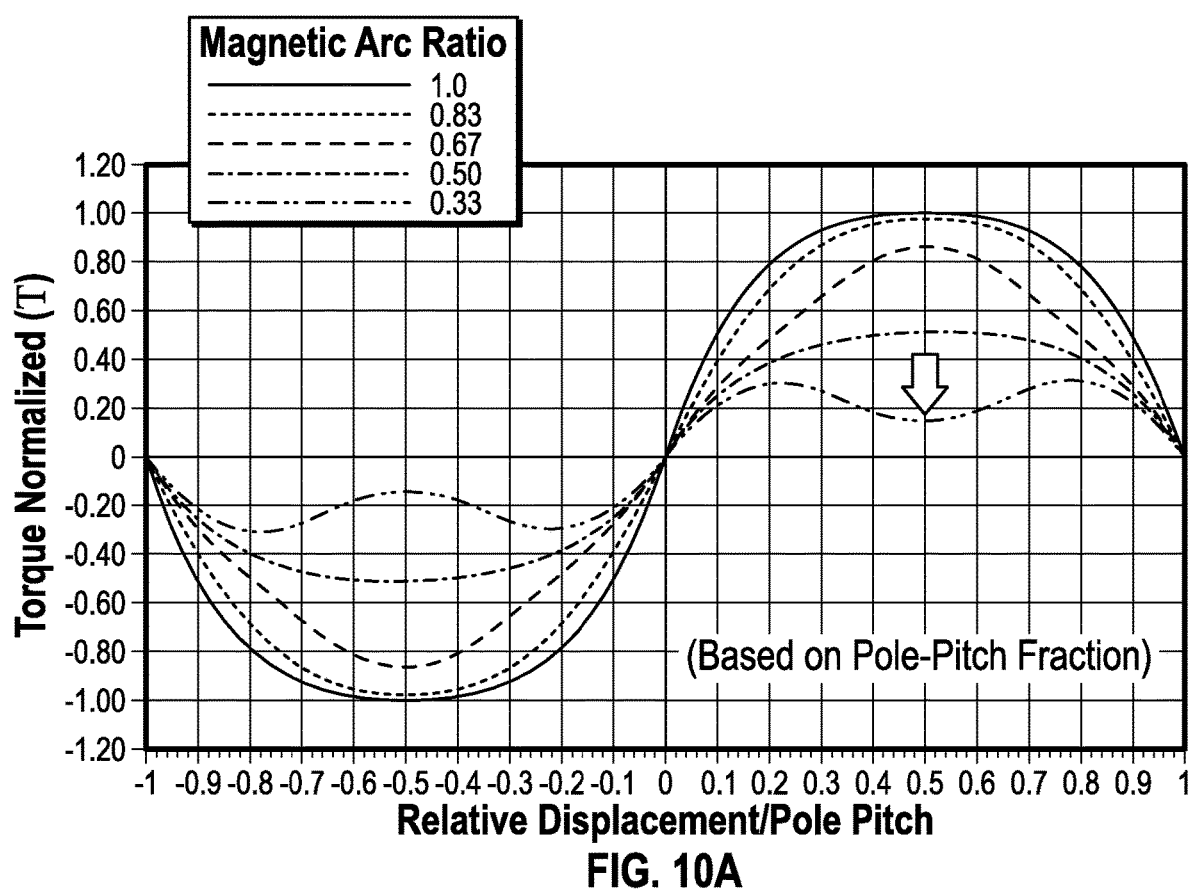
FIG. 10A is a schematic graph of torque response from a single rotor section relative to radial angular displacement and includes a comparative torque response of a magnetic arc ratio that is less than 0.50.
Figure 10B:
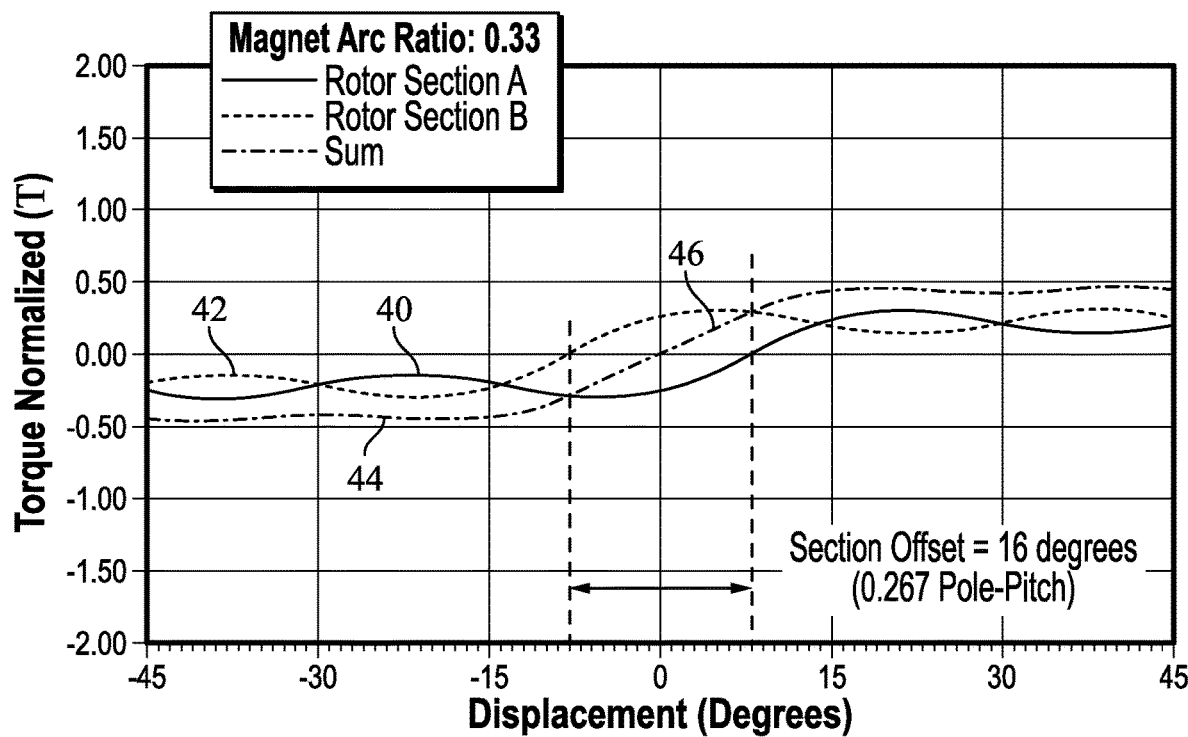
FIG. 10B is a schematic graph of torque response relative to radial angular displacement of the magnetic torsional spring similar to the embodiments of FIGS. 4A and 4B but with a 16° angular offset and a magnetic arc ratio of 0.33.
Figure 10C:
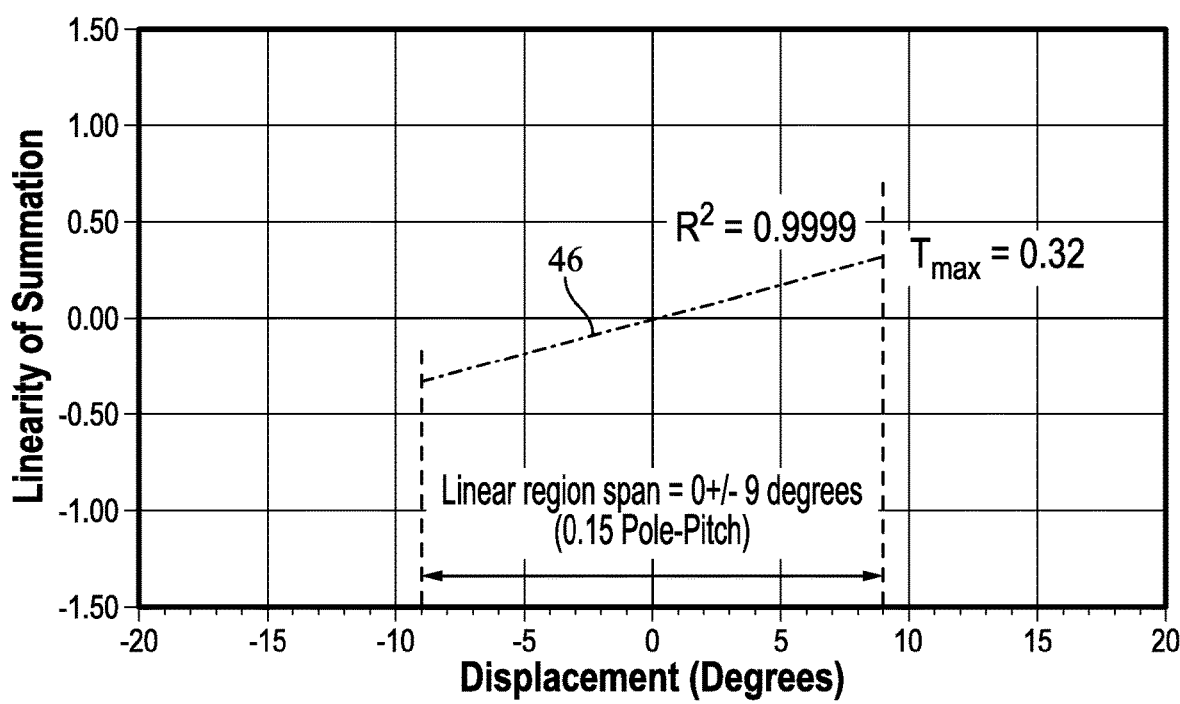
FIG. 10C is a schematic enlarged graph along a linear portion of torque response of FIG. 10B.

FIG. 10A is a schematic graph of a torque response from a single rotor section relative to radial angular displacement and includes a comparative torque response of a magnetic arc ratios of 1.0, 0.83, 0.67, 0.50, and 0.33 as an example that is less than one-half. FIG. 10B is a schematic graph of torque response relative to radial angular displacement of the magnetic torsional spring similar to the embodiments of FIGS. 4A and 4B, but a magnetic arc ratio of 0.33. FIG. 10C is a schematic enlarged graph along a linear portion of torque response of FIG. 10B. The graph is essentially the same as that of FIG. 3A for a 6-pole rotor, but serves to include the torque profile for a magnetic arc ratio less than 0.50 (specifically, 0.33), as well as those for the stated ratios, shown previously. Magnetic arc ratios less than 0.50 begin to adopt different torque profiles, showing a dip in what was a plateau region for the ratios 0.50 or more. While the invention continues to be valid for such magnetic arc ratios below 0.50, as shown in FIGS. 10B and 10C, the reduced torque and diminished width of the developed linear region of +/−9° (0.15 pole pitch), in this example may find reduced applications, unless there is a requirement for a reduced amount of magnetic material, such as the 33% of maximum available pole arc in this 0.33 magnetic arc ratio example.

The above examples were based consistently on 6-pole configurations for comparison between the illustrative and without limitation magnetic arc ratios. However, the teachings herein apply to other pole configurations. As mentioned previously, for a given pole configuration, offset angle, and magnetic arc ratio, the developed linear region can be determined at least empirically. Once determined, the developed linear region as a fraction of the pole pitch for different magnetic arc ratios are the universally applicable to assemblies with different pole numbers. For example, the 6-pole configuration with a 60 degree pole pitch (360 degrees divided by 6 poles) in FIGS. 5A and 5B, has an example of a offset of 30 degrees (0.5 pole pitch) with a developed linear region of +/−17 degrees (0.28 pole pitch). An 8-pole configuration with a defined 45 degrees pole pitch having the same 0.5 pole pitch offset angle (now adjusted by 0.5×45 degrees would be 22.5 degrees) would have the same developed linear region of 0.28 pole pitch, converted into degrees by 0.28×45 degrees to 12.6 degrees.

To express these relationship more generally than the above graphs with an X-axis in degrees, the following five sets of graphs express the same relationships in terms of a pole pitch X-axis, identified by a magnetic arc ratio equivalency.

Figure 11A:
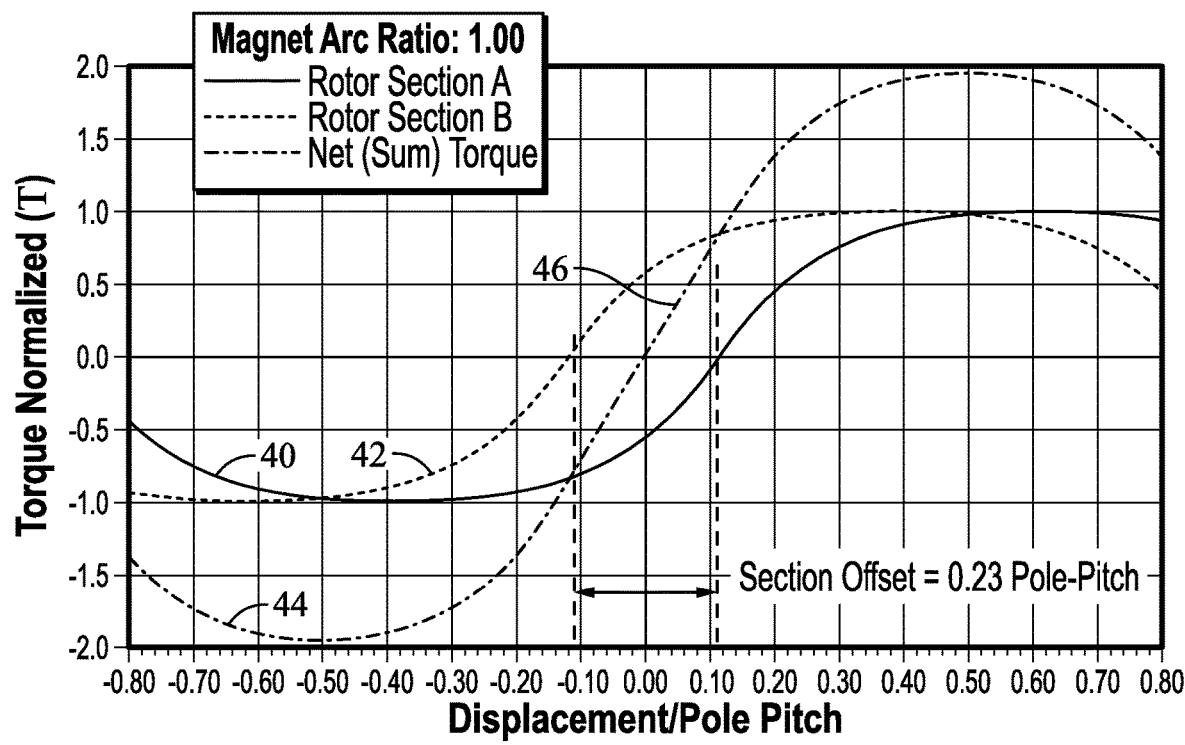
FIG. 11A is a schematic graph of torque response relative to pole pitch displacement of the magnetic torsional spring similar to the embodiment of FIGS. 4A and 4B, but with a magnetic arc ratio of 1.0.
Figure 11B:
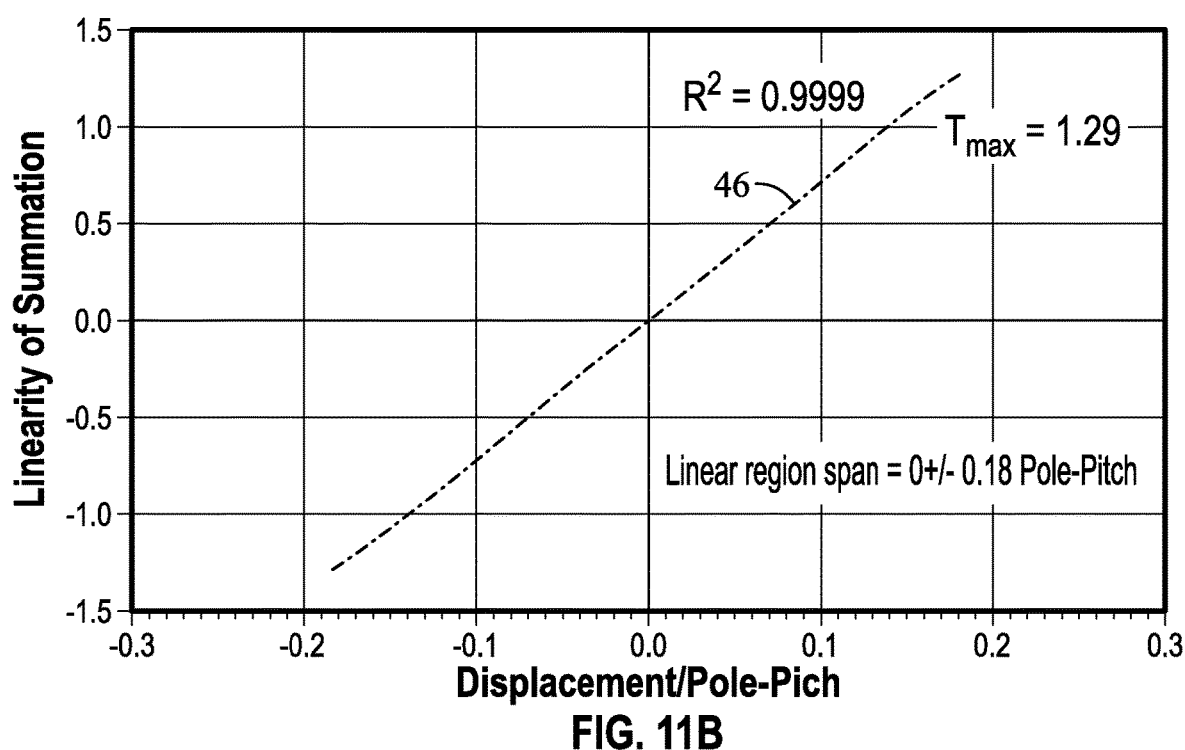
FIG. 11B is a schematic enlarged graph along a linear portion of torque response of FIG. 11A.

FIG. 11A is a schematic graph of torque response relative to radial angular displacement of the magnetic torsional spring similar to the embodiment of FIGS. 4A and 4B but a magnetic arc ratio of 1.0. FIG. 11B is a schematic enlarged graph along a linear portion of torque response of FIG. 11A. The embodiment with magnetic arc ratio of 1.0 and an offset angle of 0.23 pole pitch will result in a combined torque response 44 having a linear portion 46 of 0.18 pole pitch. The torque in that linear region has a comparative value of 1.29.

Figure 12A:
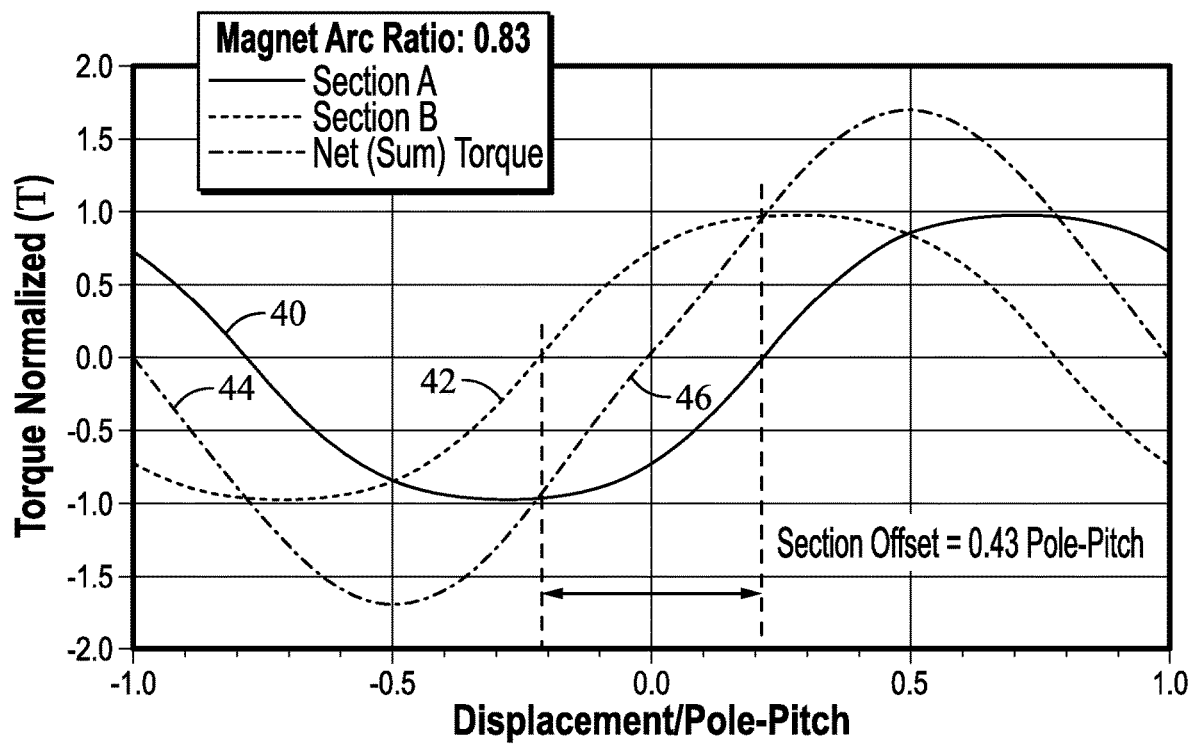
FIG. 12A is a schematic graph of torque response relative to pole pitch displacement of the magnetic torsional spring similar to the embodiment of FIGS. 4A and 4B, but with a magnetic arc ratio of 0.83.
Figure 12B:
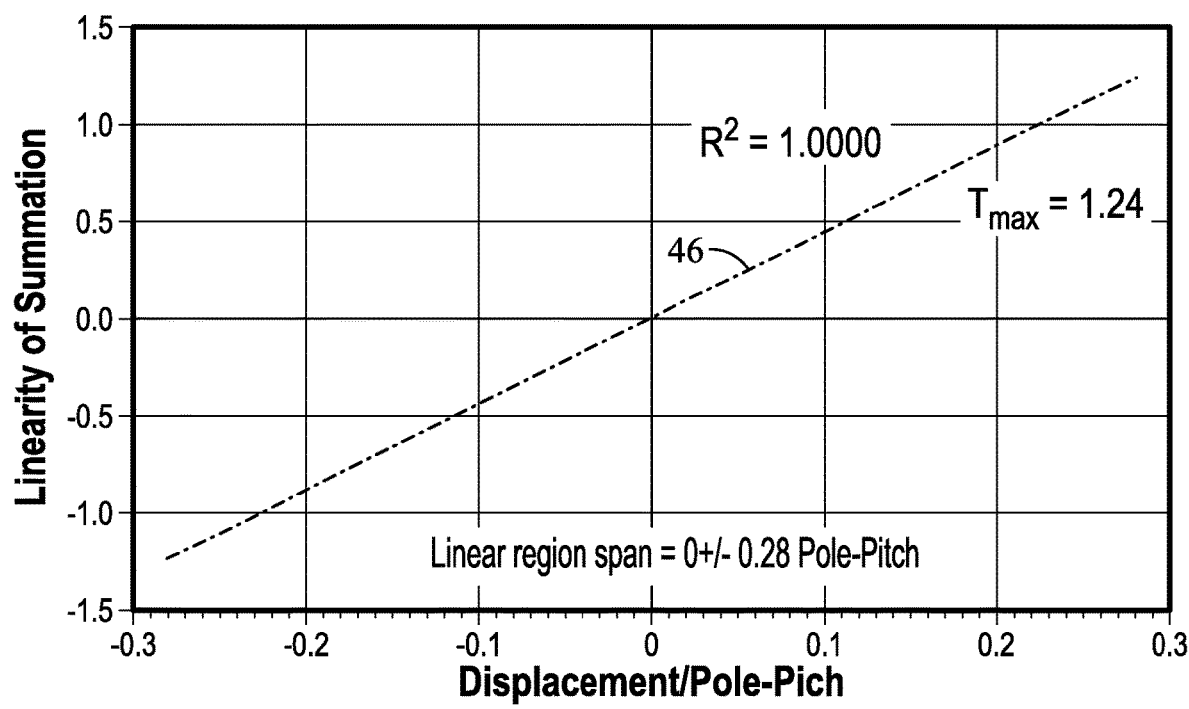
FIG. 12B is a schematic enlarged graph along a linear portion of torque response of FIG. 12A.

FIG. 12A is a schematic graph of torque response relative to radial angular displacement of the magnetic torsional spring similar to the embodiment of FIGS. 4A and 4B, but with a magnetic arc ratio of 0.83. FIG. 12B is a schematic enlarged graph along a linear portion of torque response of FIG. 12A. The embodiment with magnetic arc ratio of 0.83 and an offset angle of 0.43 pole pitch will result in a combined torque response 44 having a linear portion 46 of 0.28 pole pitch. The torque in that linear region has a comparative value of 1.24.

Figure 13A:
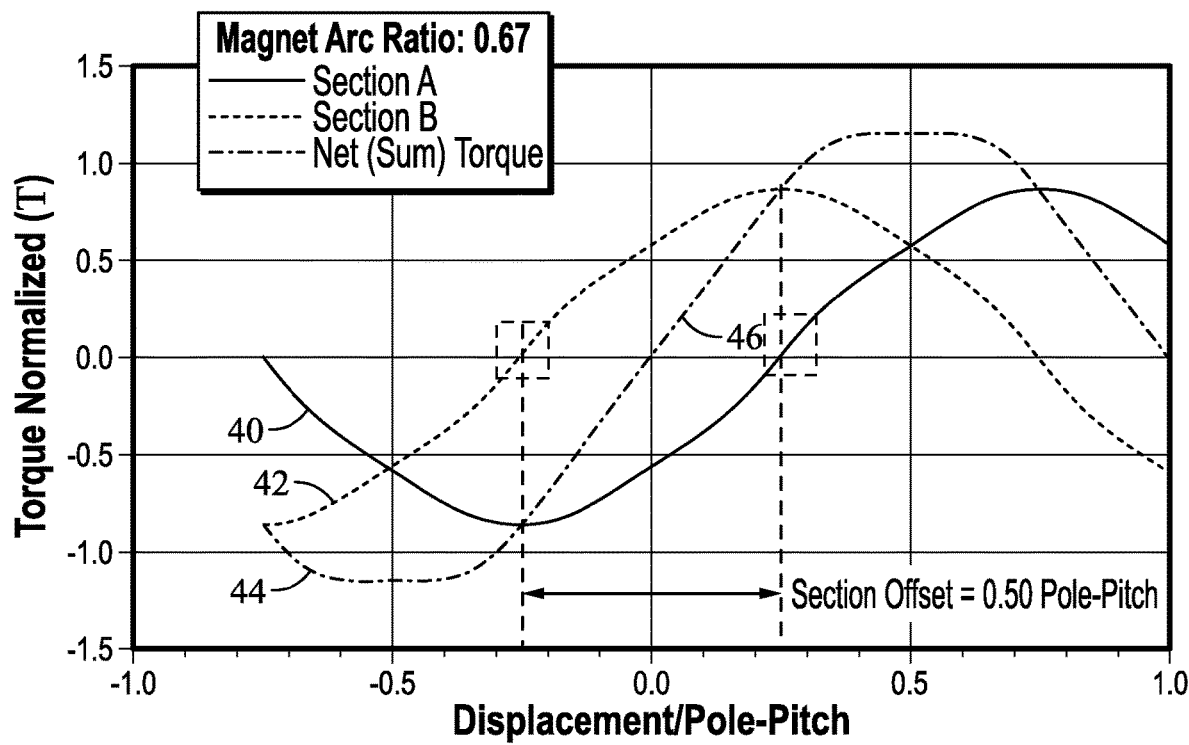
FIG. 13A is a schematic graph of torque response relative to pole pitch displacement of the magnetic torsional spring similar to the embodiment of FIGS. 4A and 4B, but with a magnetic arc ratio of 0.67.
Figure 13B:
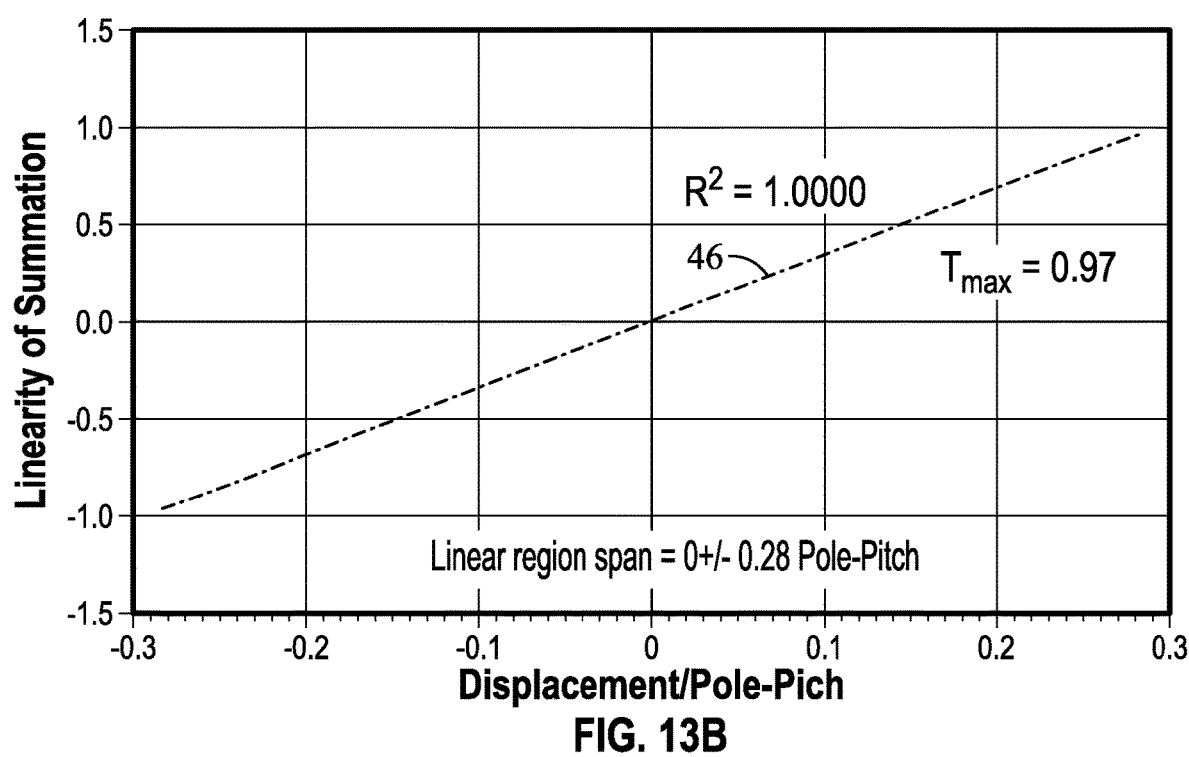
FIG. 13B is a schematic enlarged graph along a linear portion of torque response of FIG. 13A.

FIG. 13A is a schematic graph of torque response relative to radial angular displacement of the magnetic torsional spring similar to the embodiment of FIGS. 4A and 4B, but with a magnetic arc ratio of 0.67. FIG. 13B is a schematic enlarged graph along a linear portion of torque response of FIG. 13A. The embodiment with magnetic arc ratio of 0.67 and an offset angle of 0.50 pole pitch will result in a combined torque response 44 having a linear portion 46 of 0.28 pole pitch. The torque in that linear region is a comparative value of 0.97.

Figure 14A:
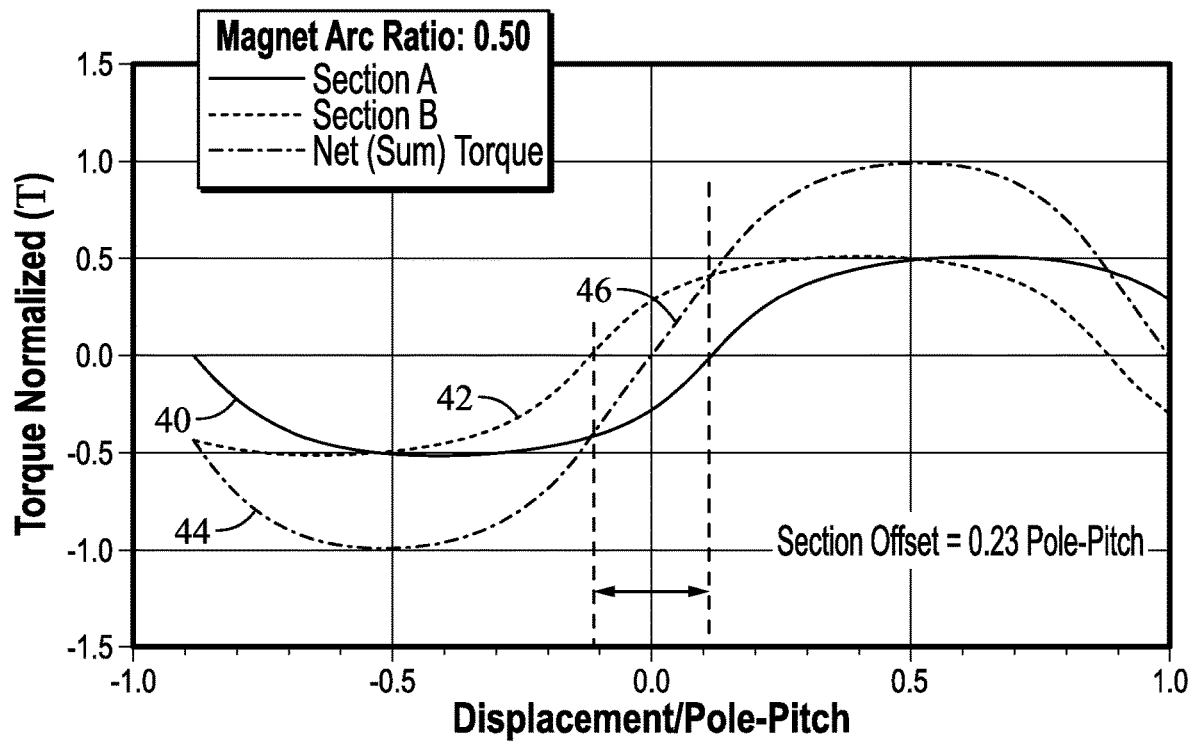
FIG. 14A is a schematic graph of torque response relative to pole pitch displacement of the magnetic torsional spring similar to the embodiment of FIGS. 4A and 4B, but with a magnetic arc ratio of 0.50.
Figure 14B:
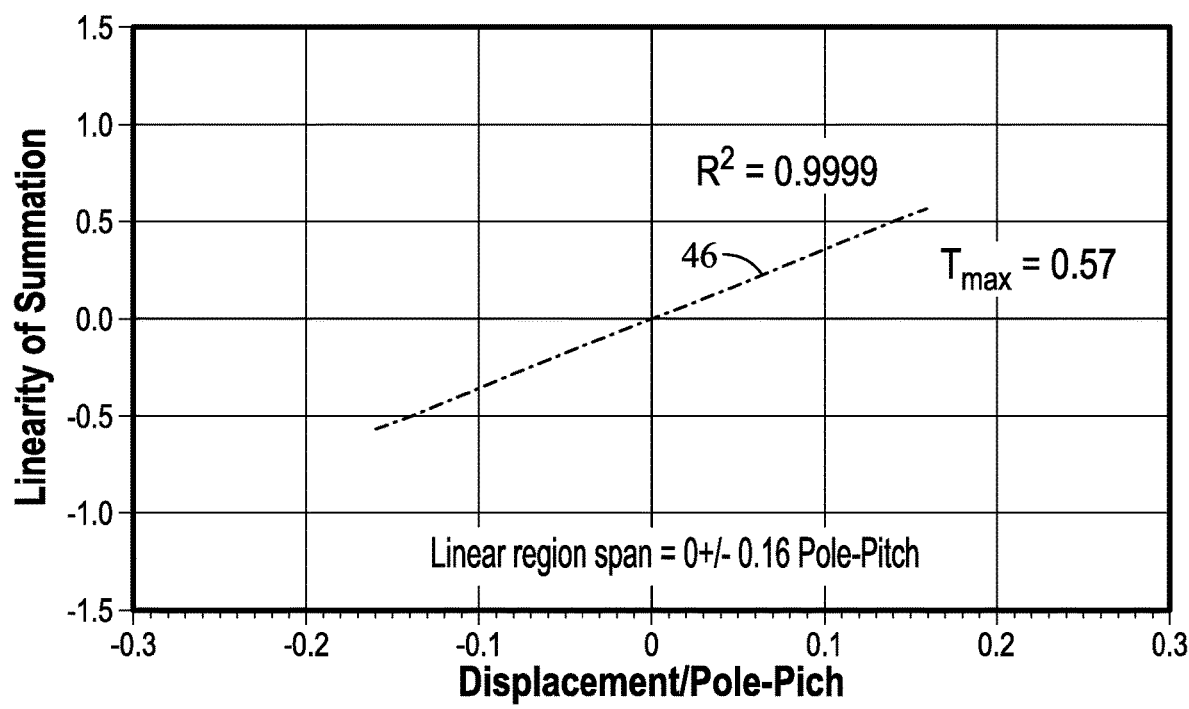
FIG. 14B is a schematic enlarged graph along a linear portion of torque response of FIG. 14A.

FIG. 14A is a schematic graph of torque response relative to radial angular displacement of the magnetic torsional spring similar to the embodiment of FIGS. 4A and 4B, but a magnetic arc ratio of 0.50. FIG. 14B is a schematic enlarged graph along a linear portion of torque response of FIG. 14A. The embodiment with magnetic arc ratio of 0.50 and an offset angle of 0.23 pole pitch will result in a combined torque response 44 having a linear portion 46 of 0.16 pole pitch. The torque in that linear region is a comparative value of 0.57.

Figure 15A:
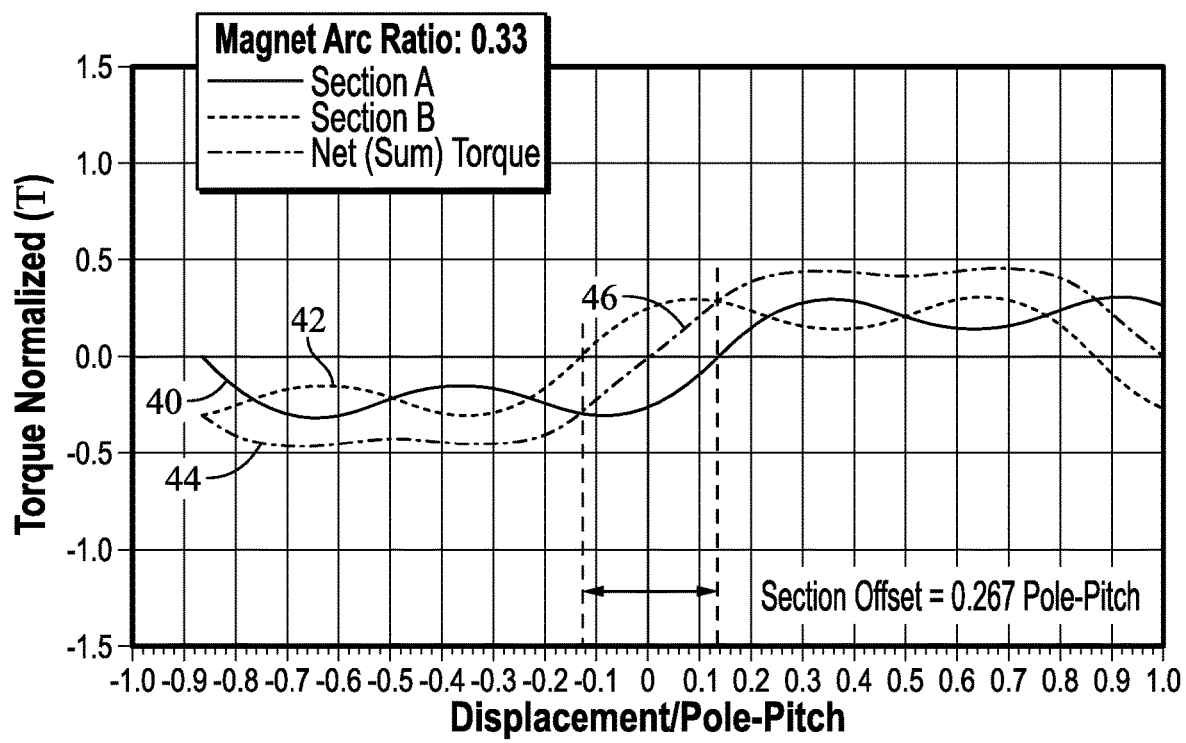
FIG. 15A is a schematic graph of torque response relative to pole pitch displacement of the magnetic torsional spring similar to the embodiment of FIGS. 4A and 4B, but with a magnetic arc ratio of 0.33.
Figure 15B:
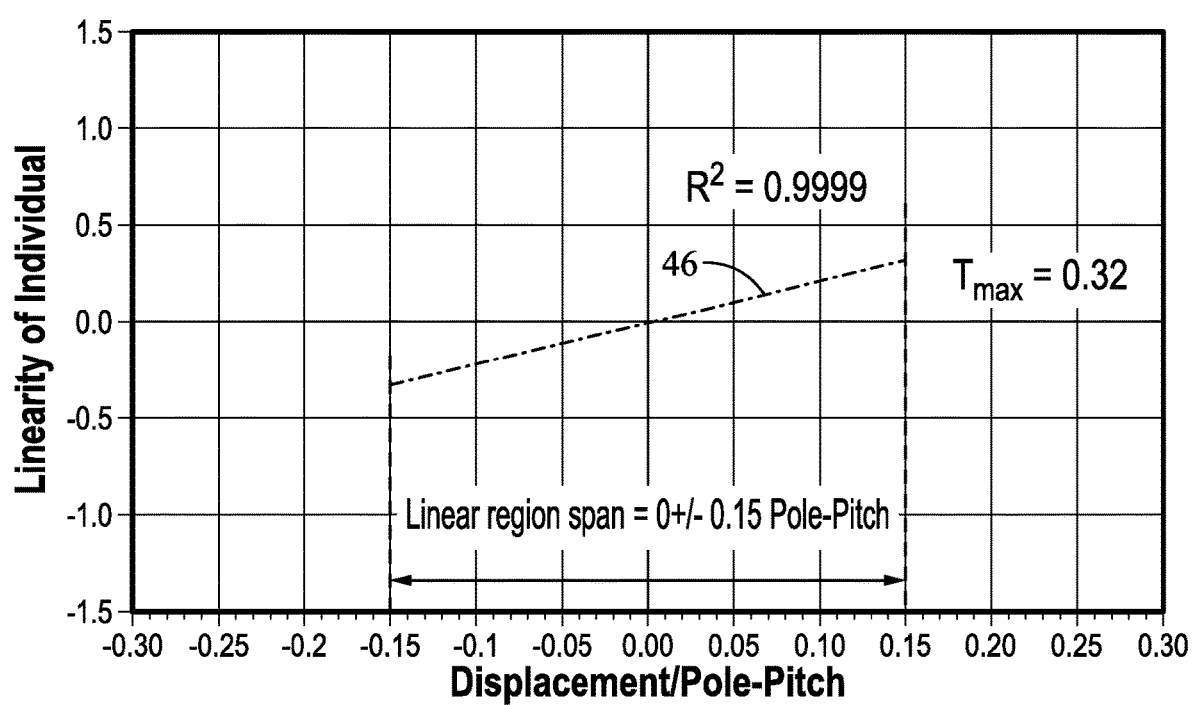
FIG. 15B is a schematic enlarged graph along a linear portion of torque response of FIG. 15A.

FIG. 15A is a schematic graph of torque response relative to radial angular displacement of the magnetic torsional spring similar to the embodiments of FIGS. 4A and 4B but a magnetic arc ratio of 0.33. FIG. 15B is a schematic enlarged graph along a linear portion of torque response of FIG. 15A. The embodiment with magnetic arc ratio of 0.33 and an offset angle of 0.267 pole pitch will result in a combined torque response 44 having a linear portion 46 of 0.15 pole pitch. The torque in that linear region is a comparative value of 0.32.

Figure 16A:
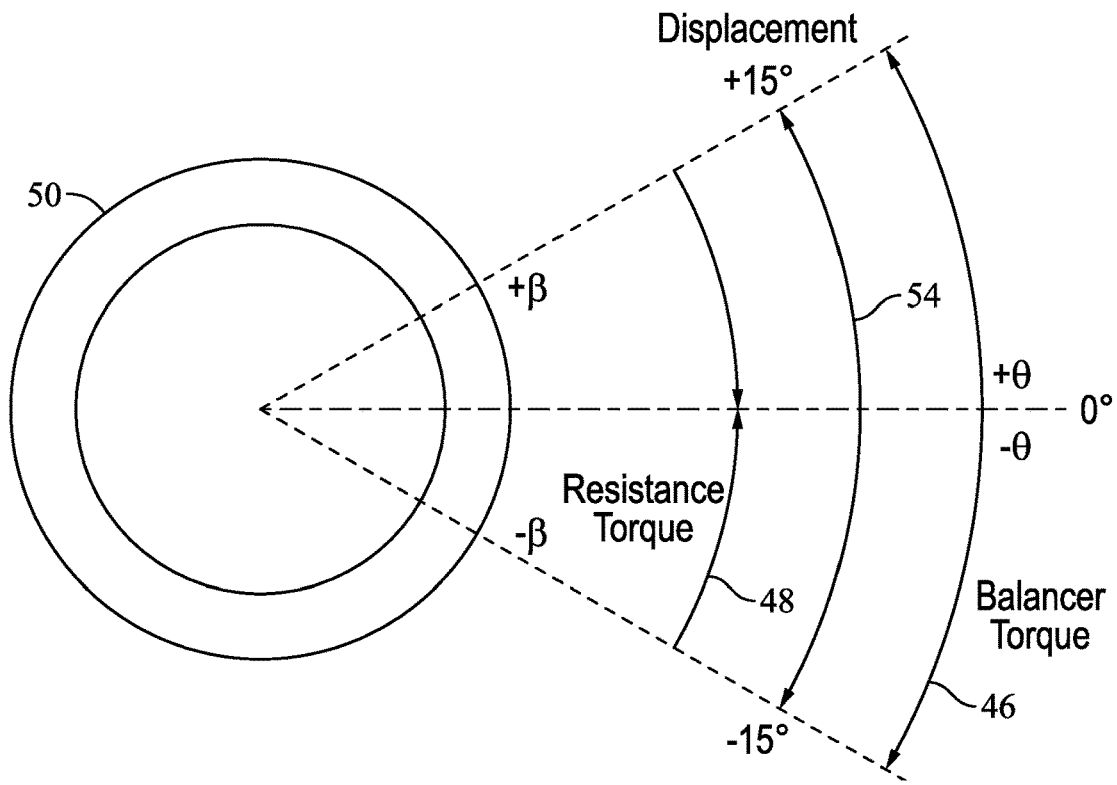
FIG. 16A is a schematic of torsional spring that is configured to rotationally twist about a longitudinal axis between a negative and positive angular displacement relative to a datum.
Figure 16B:
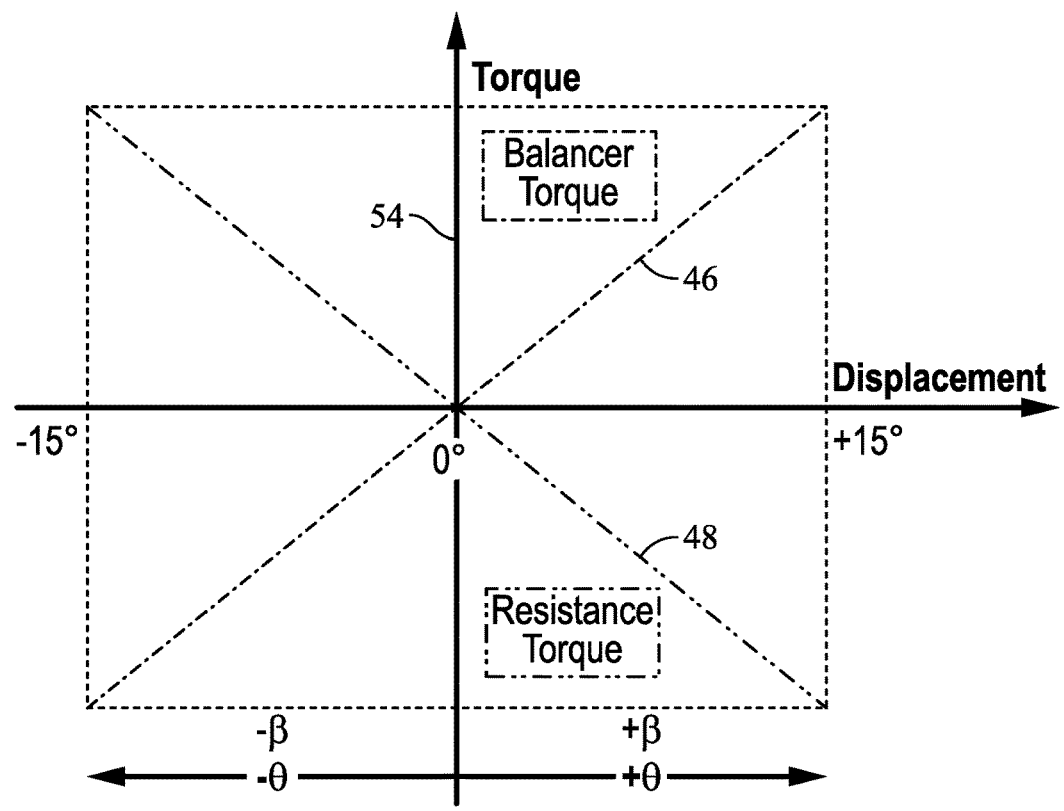
FIG. 16B is a schematic graph of torque relative to angular displacement for the torsional spring of FIG. 16A counterbalanced by the illustrative magnetic torsional springs, described herein, such as in FIGS. 4A and 4B.

FIG. 16A is a schematic of torsional spring that is configured to rotationally twist about a longitudinal axis between a negative and positive angular displacement relative to a datum. FIG. 16B is a schematic graph of torque relative to angular displacement for the torsional spring of FIG. 16A counterbalanced by any of the illustrative magnetic torsional springs, described herein, such as in FIGS. 4A and 4B. A torsional spring 50 can illustrate a source of a spring force that can be at least partially counterbalanced by the torque from the magnetic torsional spring 20. The torsional spring 50 can be twisted about its longitudinal axis, for example, by a resistance displacement angle β to establish a resistant spring force in the form of a torque response 48. The torque response 48 may be negative or positive relative to a datum, depending upon the angular displacement being negative or positive. As illustrated in FIG. 16B, the torque response 48 is generally linear and varies proportionately with the amount of angular displacement of the torsional spring. The magnetic torsional spring 20 with its linear torque response 46 for a given angle θ, such as shown in FIGS. 5A and 5B, can be used to at least partially counterbalance the torsional spring torque response 48 in proportion to the amount of angular displacement at angle β of the torsional spring 50. The result can be a counterbalanced torque response, such as equal to zero or minimal variation along the line 54. The angle θ can be a 1:1 ratio with the angle β or some factor thereof, so that an appropriate force from the magnetic torsional spring can be applied to the torsional spring force for the desired counterbalancing force.

Figure 17A:
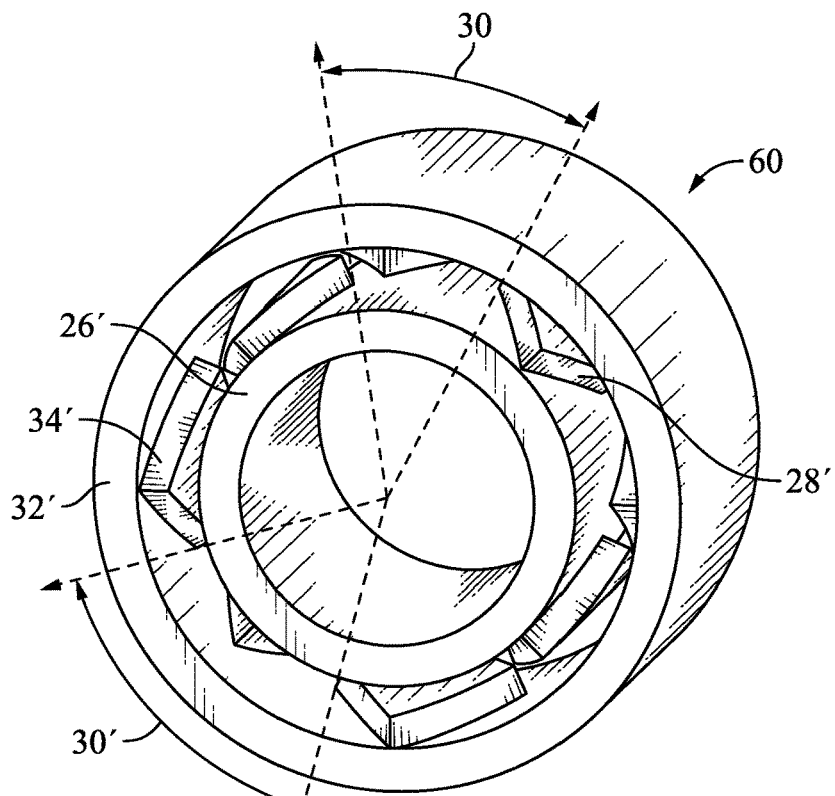
FIG. 17A is a schematic perspective view of another illustrative embodiment of a magnetic torsional spring according to the invention.
Figure 17B:
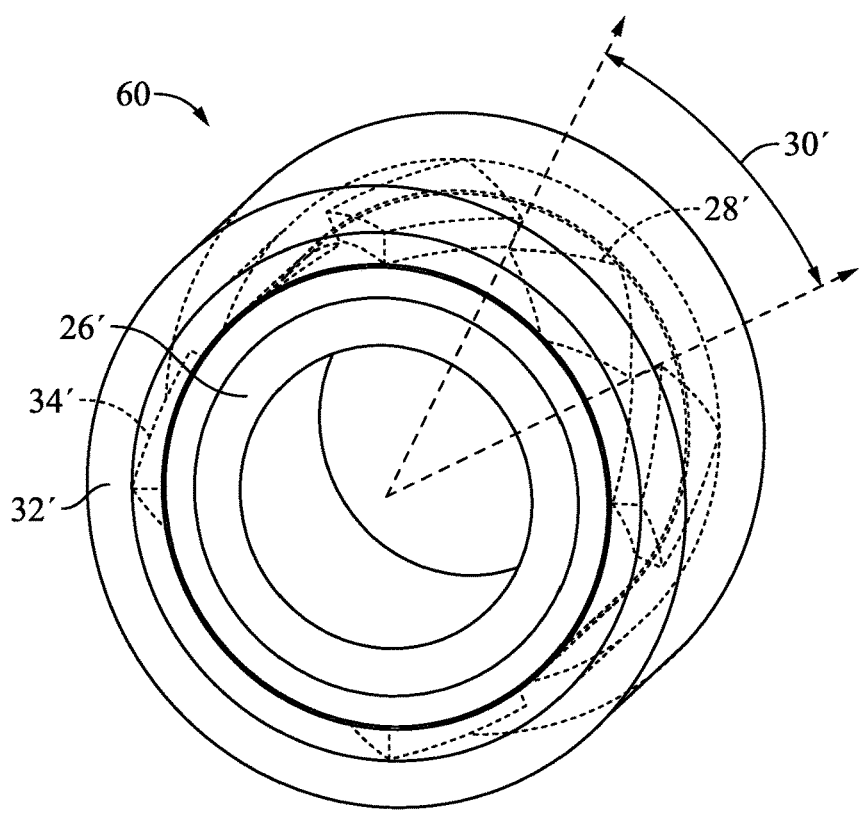
FIG. 17B is a schematic perspective view of the magnetic torsional spring of FIG. 17A, showing an inner structure of the magnetic pole arrangement.
Figure 17C:
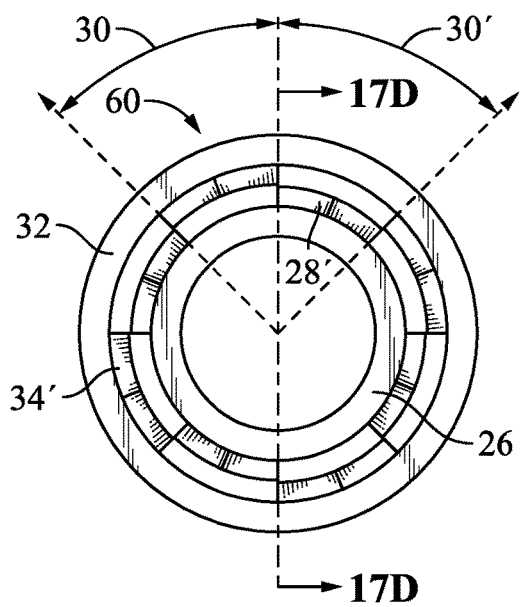
FIG. 17C is a schematic cross sectional view of the magnetic torsional spring of FIG. 17A.
Figure 17D:
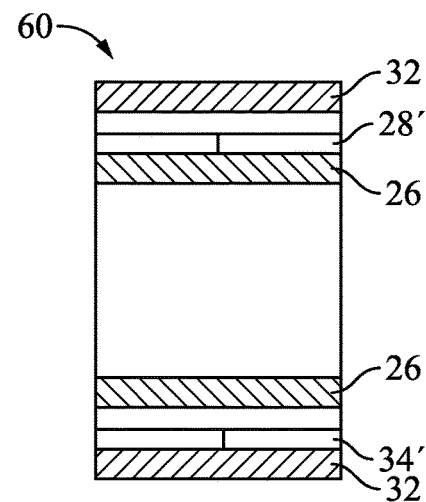
FIG. 17D is a schematic longitudinal cross sectional view of an inner and outer magnetic pole pairing of the magnetic torsional spring of FIG. 17C.
Figure 17E:
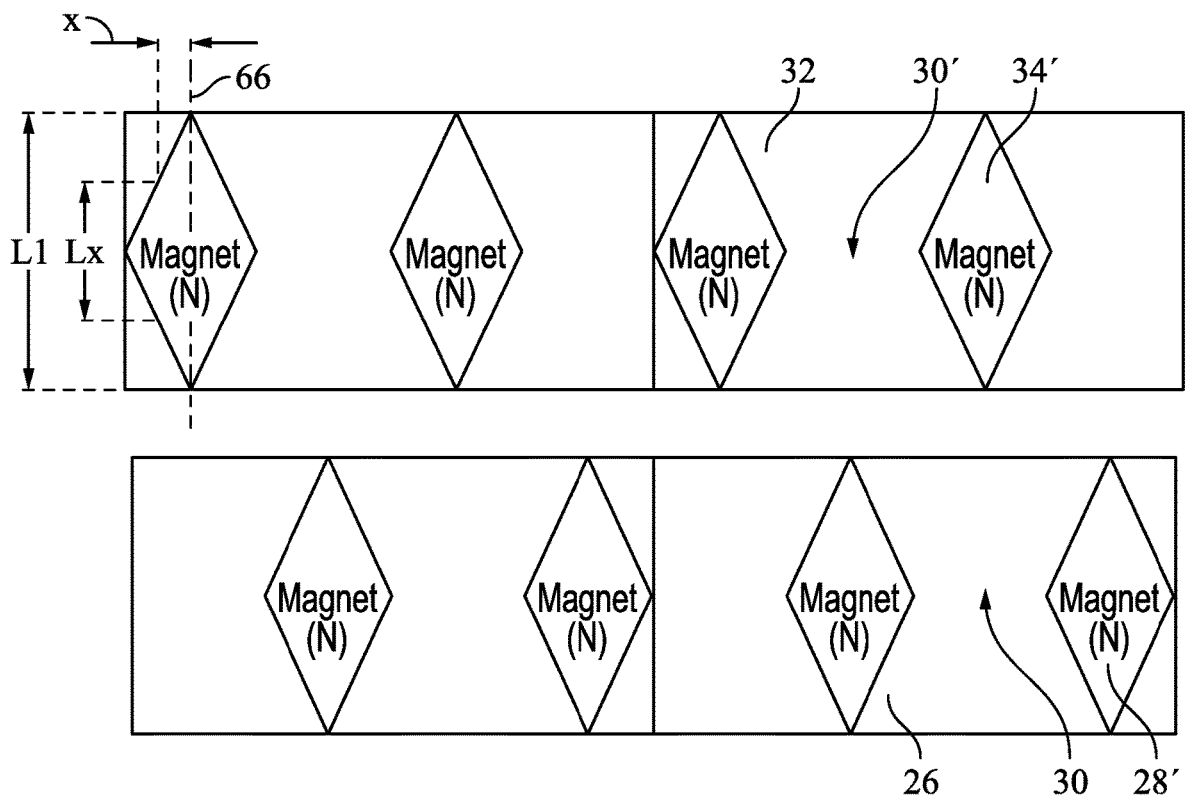
FIG. 17E is a schematic unfolded two-dimensional layout of the three-dimensional magnetic pole arrangement of the inner and outer rotors of the magnetic torsional spring of FIG. 17A.

FIG. 17A is a schematic perspective view of another illustrative embodiment of a magnetic torsional spring according to the invention. FIG. 17B is a schematic perspective view of the magnetic torsional spring of FIG. 17A, showing an inner structure of the magnetic pole arrangement. FIG. 17C is a schematic cross sectional view of the magnetic torsional spring of FIG. 17A. FIG. 17D is a schematic longitudinal cross sectional view of an inner and outer magnetic pole pairing of the magnetic torsional spring of FIG. 17C. FIG. 17E is a schematic unfolded two-dimensional layout of the three-dimensional magnetic pole arrangement of the inner and outer rotors of the magnetic torsional spring of FIG. 17A.

An alternative to achieve a linear torque response from a magnetic torsional spring can be with profiled and specially shaped magnets. The embodiment shown in FIGS. 16A-16E has a significantly lower torque capacity than the embodiments in FIGS. 4A and 4B and elsewhere in the description, but have a wider developed linear region. In general, the magnets of the inner and outer rotors have a shape that from a magnet longitudinal axis 66 with an axial length L1 generally progressively decreases to a length Lx at an increasing distance X from the longitudinal axis 66. In this example, the magnets are diamond-shaped. The progressive overlap of the shaped attracting magnetic faces (N-S or S-N), where the overlap area increases with displacement, yields an increasing positive tangential force. Equally, the progressive overlap of repelling magnetic pole faces (N-N, S-S) yields an increasing negative tangential force. Essentially, the gradual change in shape can create the linearity produced by the offset magnets of multiple rotor sections.

More specifically, the magnetic torsional spring 60 includes an inner rotor 26 having magnets 28' disposed circumferentially around the inner rotor with a circumferential gap 30 between the magnetic poles. An outer rotor 32' includes magnets 34' disposed circumferentially around the outer rotor with a circumferential gap 30' between the magnets. In this illustrative embodiment, there are four magnets in each rotor, forming a 4-pole magnetic torsional spring.

Due to the triangular surface of the magnetic poles, the transition between overlapping magnetic poles during rotation results in a gradual increase and decrease of torque. The gradual transition between the magnetic poles can be seen in FIGS. 16D, as a longitudinal cross section of the illustrative magnets 28' and 34'.

Figure 18A:
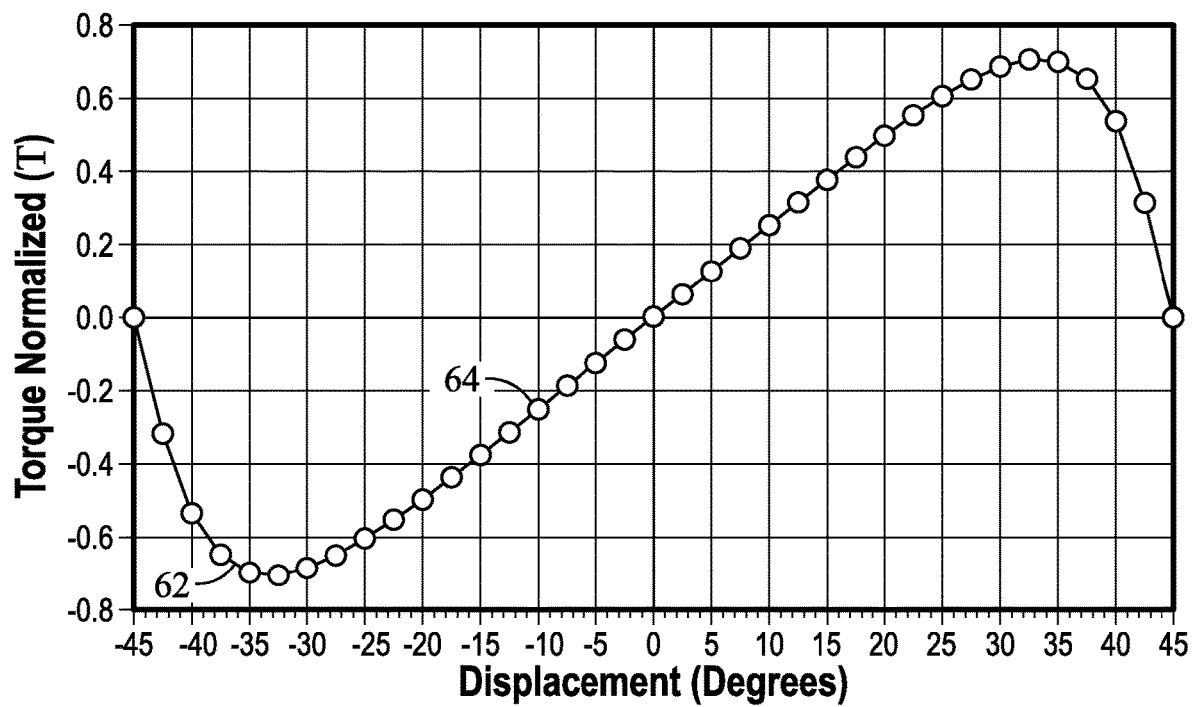
FIG. 18A is a schematic graph of torque response relative to angular displacement for the magnetic torsional spring of FIG. 17A.
Figure 18B:
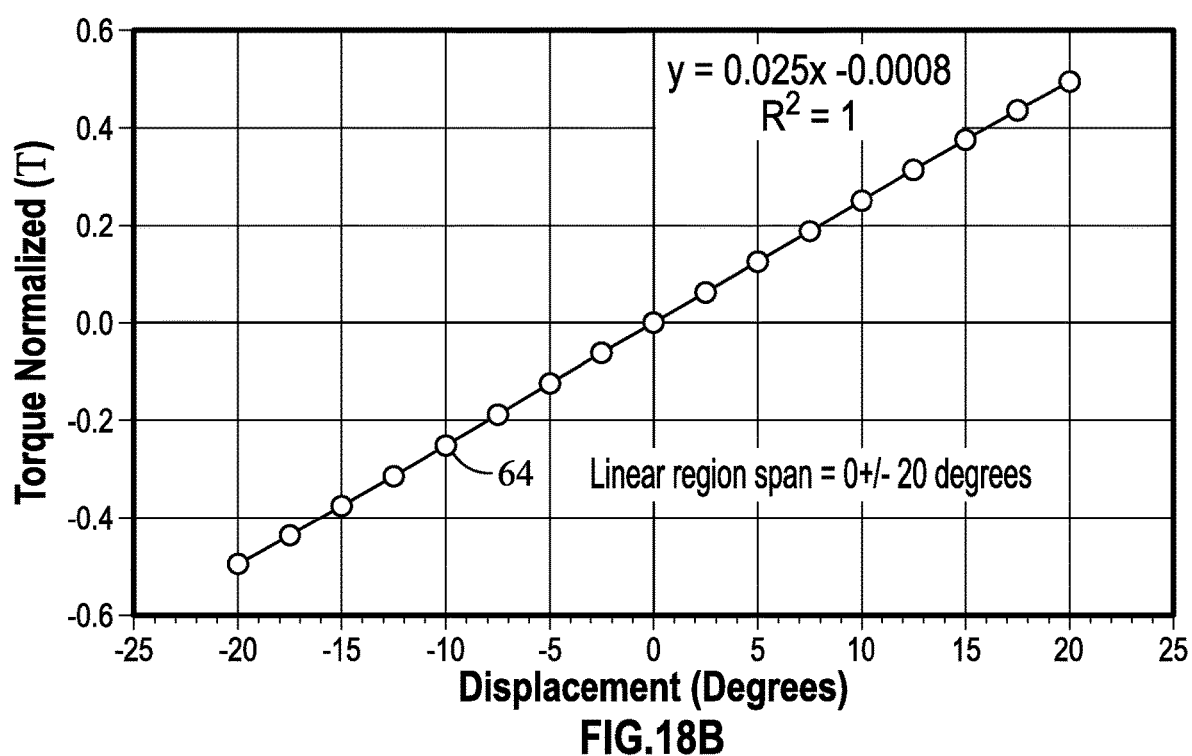
FIG. 18B is a schematic enlarged graph along a linear portion of torque response of FIG. 18A.

FIG. 18A is a schematic graph of torque response relative to angular displacement for the magnetic torsional spring of FIG. 16A. FIG. 18B is a schematic enlarged graph along a linear portion of torque response of FIG. 18A. FIGS. 18A and 18B show the torque response from the zero, null-displacement position, where the permanent magnetic poles on each rotor face each other across the air gap.

The results from the magnetic torsional spring 60 show a wider torque response 62 in FIG. 18A than, for example, the torque response 44 in FIG. 5A. However, the torque developed by this embodiment is less than the torque in the linear range in FIG. 5A developed by the embodiment of FIGS. 4A and 4B. The torque in the embodiment of FIGS. 17A-17E can be increased by larger diameter rotors or by axially extended rotors, including additional rotor sections, if space is available.

While the magnetic torsional spring has been described in various embodiments including an illustrative counterbalancing application, the magnetic torsional spring is not limited to such embodiments or application. For example, an appropriate arrangement and shape of magnetic poles and spacing can create a different torque response, including non-linear suitable for a given application. Further, the magnetic torsional spring can be equipped with sensors coupled to processors and other devices for actuating, controlling, measuring, or other operational functions, as would be known to those with ordinary skill in the art given the teachings herein.

Other and further embodiments utilizing one or more aspects of the inventions described above can be devised without departing from the disclosed invention as defined in the claims. For example, some of the components could be arranged in different locations, and other variations that are limited only by the scope of the claims.

The invention has been described in the context of preferred and other embodiments, and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope of the following claims.

What is claimed is:

1. A magnetic torsional spring, comprising:
   at least a first rotor section and a second rotor section, each rotor section comprising:
   an outer rotor with an inner peripheral cylindrical surface, the outer rotor comprising a plurality of magnets having an inner magnetic surface and being disposed circumferentially around the inner peripheral cylindrical surface;

an inner rotor with an outer peripheral cylindrical surface, the inner rotor comprising a plurality of magnets having an outer magnetic surface and being disposed circumferentially around the outer peripheral cylindrical surface; and the inner rotor sized to fit inside an inside diameter of the outer rotor with a radial gap between the outer magnetic surface and the inner magnetic surface;

wherein one of the rotors is configured to be rotated relative to the other rotor; and wherein at least one of the magnets of a rotor of the first rotor section is angularly offset from at least one of the magnets of a corresponding rotor of the second rotor section; and wherein at least one rotor section is configured to produce a first torque response and a second rotor section is configured to produce a second torque response out of phase with the first torque response and the sum of the first and second torque responses creates a combined torque response with a developed linear portion that is greater than a linear portion, if any, of either of the first torque response and the second torque response.

2. The magnetic torsional spring of claim 1, wherein at least one of the magnets of a rotor of the first rotor section is fixed angularly offset from at least one of the magnets of a corresponding rotor of the second rotor section.

3. The magnetic torsional spring of claim 2, wherein the combined torque response provides a higher torque value than a torque value of either of the first torque response and the second torque response.

4. The magnetic torsional spring of claim 1, wherein the magnetic torsional spring creates a torque response that is linear within a radial angular displacement range between the inner rotors and outer rotors.

5. The magnetic torsional spring of claim 4, wherein the radial angular displacement range is greater than +/−10° of a datum.

6. The magnetic torsional spring of claim 1, wherein the magnets are spaced on each rotor and are spaced away from each other around the circumference by a circumferential gap.

7. The magnetic torsional spring of claim 1, wherein the outer rotors are rotationally fixed and the inner rotors are configured to rotate relative to the outer rotors.

8. The magnetic torsional spring of claim 1, wherein the inner rotors are rotationally fixed and the outer rotors are configured to rotate relative to the inner rotors.

9. The magnetic torsional spring of claim 1, wherein the inner rotors are configured to rotate in unison.

10. The magnetic torsional spring of claim 1, wherein the outer rotors are configured to rotate in unison.

11. The magnetic torsional spring of claim 1, further comprising an axial gap between at least two of the rotor sections.

12. The magnetic torsional spring of claim 1, further comprising a torsional spring having a spring force equal to a spring constant multiplied by a radial angular displacement and wherein the magnetic torsional spring creates a torque force configured to at least partially counterbalance the spring force at a plurality of angular displacements of the torsional spring.

13. A magnetic torsional spring, comprising:
at least one rotor section comprising:
an outer rotor with an inner peripheral cylindrical surface, the outer rotor comprising and having a plurality of magnets having an inner magnetic surface and being disposed circumferentially around the inner peripheral cylindrical surface;
an inner rotor with an outer peripheral cylindrical surface, the inner rotor comprising a plurality of magnets having an outer magnetic surface and being disposed circumferentially around the outer peripheral cylindrical surface; and
the inner rotor sized to fit inside an inside diameter of the outer rotor with a radial gap between the outer magnetic surface and the inner magnetic surface;
wherein at least one of the magnets of at least one of the rotors has a longitudinal axis with an axial length and wherein the axial length of the at least one of the magnets decreases at an increasing distance from the longitudinal axis.

14. The magnetic torsional spring of claim 13, wherein one of the rotors is configured to be rotated relative to the other rotor in the rotor section.

15. The magnetic torsional spring of claim 13, wherein the magnetic torsional spring creates a torque response that is linear within a radial angular displacement range between the inner rotor and outer rotor.

16. The magnetic torsional spring of claim 15, wherein the radial angular displacement range is greater than +/−10° of a datum.

17. A method of controlling movement of a structure, comprising:
rotating at least one rotor of the at least two rotor sections of claim 1; and
controlling movement of the structure within a linear portion of a torque response developed from the rotating.

18. A method of controlling movement of a structure, comprising:
rotating the at least one rotor section of claim 13; and
controlling movement of the structure within a linear portion of a torque response developed from the rotating.

19. The magnetic torsional spring of claim 1, wherein the outer rotor comprises a plurality of permanent magnets.

20. The magnetic torsional spring of claim 1, wherein at least one of the inner rotor and the outer rotor rotate relative to the other within an angle having a linear torque.

* * * * *